United States Patent [19]

Atherton

[11] Patent Number: 4,796,194
[45] Date of Patent: Jan. 3, 1989

[54] REAL WORLD MODELING AND CONTROL PROCESS

[76] Inventor: Robert W. Atherton, 1694 Miller Ave., Los Altos, Calif. 94022

[21] Appl. No.: 898,131

[22] Filed: Aug. 20, 1986

[51] Int. Cl.$^4$ .................. G06F 15/46; G06F 15/24
[52] U.S. Cl. ........................... 364/468; 364/149; 364/156; 364/300; 364/478
[58] Field of Search ............... 364/468, 469, 474, 475, 364/478, 578, 401, 402, 403, 149–151, 156, 300, 513, 200 MS File, 900 MS File, 488–491; 235/376, 375, 385; 437/7, 8, 51

[56] References Cited

U.S. PATENT DOCUMENTS

| | | | |
|---|---|---|---|
| 3,598,604 | 8/1971 | de Puy | 96/36.2 |
| 3,615,463 | 10/1971 | Kuschell | 96/36.2 |
| 3,615,464 | 10/1971 | Benjamin et al. | 437/8 |
| 3,615,466 | 10/1971 | Sahni | 96/36.2 |
| 3,703,725 | 11/1972 | Gomersall et al. | 364/468 |
| 3,725,653 | 4/1973 | Carr et al. | 364/149 |
| 3,751,647 | 8/1973 | Maeder et al. | 364/150 X |
| 3,800,288 | 3/1974 | Russell et al. | 340/172.5 |
| 3,821,045 | 6/1974 | Wolfe | 156/3 |
| 3,839,781 | 10/1974 | Russell | 29/574 |
| 3,842,491 | 10/1974 | Depuy et al. | 29/580 |
| 3,882,305 | 5/1975 | Johnstone | 235/151.11 |
| 4,010,354 | 3/1977 | Apicella, Jr. et al. | 235/61.6 R |
| 4,027,246 | 4/1977 | Caccoma et al. | 235/151.1 |
| 4,131,472 | 12/1978 | MacDonald et al. | 96/38.3 |
| 4,237,598 | 12/1980 | Williamson | 364/474 X |
| 4,295,198 | 10/1981 | Copeland et al. | 364/491 X |
| 4,303,973 | 12/1981 | Williamson, Jr. et al. | 364/103 |
| 4,320,463 | 3/1982 | Himmelstein | 364/552 |
| 4,331,702 | 5/1982 | Hieber et al. | 427/10 |
| 4,383,298 | 5/1983 | Huff | 364/200 X |
| 4,441,207 | 4/1984 | Lougheed et al. | 364/490 X |
| 4,450,579 | 5/1984 | Nakashima et al. | 364/490 X |
| 4,454,585 | 6/1984 | Ele | 364/552 X |
| 4,459,663 | 7/1984 | Dye | 364/200 |
| 4,481,664 | 11/1984 | Linger et al. | 364/489 X |

OTHER PUBLICATIONS

S. S. Panwalkar and W. Iskander, "A Survey of Scheduling Rules", *Operations Research*, vol. 25, No. 1, Jan.–Feb. 1977, pp. 45–61.

E. M. Dar-El and R. Karni, "A Review of Production Scheduling and its Applications in On-Line Hierarchical Computer Control Systems", in *On-Line Production Scheduling and Plant-Wide Control*, E. J. Compass & T. J. Williams (eds.) Tech. Publ. Co., Barrington, Ill., 1982, pp. 1–25.

(List continued on next page.)

*Primary Examiner*—Joseph Ruggiero
*Attorney, Agent, or Firm*—Flehr, Hohbach, Test, Albritton & Herbert

[57] ABSTRACT

A modeling and control process for distributed factories having fabrication sequences starts with a definition of how the factory actually operates, rather than a mathematical theory which ultimately leads to a definition of the plant operation. The process begins by delineating a set of factory operating rules which define how part lots interact with machines in actual operation of the factory. A dynamic model of the factory is selected from a group of specimen models for such factories. The model defines the factory by its machines, products, fabrication sequences, collections of job sets, scheduling rules, and machine reliability parameters. The parameters that describe the specific factory are determined and defined in terms of data structures of the individual factory model. The factory specific model contains descriptions of the dynamic interactions of lots and machines. The behavior of the factory can be simulated in detail. A comparision of such a simulation against actual observation of the factory can be used to refine the model. Because the process begins with a definition of how the factory actually operates, calculations for even very complex-factory simulations, such as integrated circuit fabrication facilities, are simplified so that small computers, such as personal computers, may be employed. The models and simulations can be made accurate enough to allow automatic computer control of the factory using the models and simulations.

58 Claims, 6 Drawing Sheets

OTHER PUBLICATIONS

T. E. Wollman, W. L. Berry and D. C. Whybark, Chapter 5, "Shop-Floor Control", and Chapter 13, "Advanced Concepts in Scheduling", in *Manufacturing Planning and Control Systems*, Dow Jones-Irwin, Homewood, Ill., 1984, pp. 113-145 and 373-403.

E. A. Elsayed and T. O. Boucher, Chapter 7, "Job Sequencing and Operations Scheduling" in *Analysis and Control of Production Systems*, Prentice Hall, Englewood Cliffs, N.J., 1985, pp. 227-285.

S. K. Jain, "A Simulation-Gased Scheduling and Management Information System for a Machine Shop", *Interface*, Nov., 1975, pp. 81-96.

J. E. Dayhoff and R. W. Atherton, "Simulation of VLSI Manufacturing Areas", *VLSI Design*, Dec. 1984, pp. 84-92.

D. P. Clemens and G. L. Castleman, "Distributed Computer Network Takes Charge in IC Facility", *Electronics*, Jun. 5, 1980, pp. 151-155.

REAL WORLD MODELING AND CONTROL PROCESS

BACKGROUND OF THE INVENTION

1. Field of the Invention

This invention relates to a process for the modeling and control of distributed factories which have fabrication sequences. It further relates to a class of sequenced-distributed-factory (SDF) dynamic models. It also relates to factory-specific models from the SDF class and to the use of such factory specific model to generate factory schedules and to control material movement and machine loadings in the factory. The invention further relates to a computer integrated manufacturing (CIM) system that includes a factory specific model for automatic control and to the use of SDF models for the design of CIM systems.

2. Description of the Prior Art

Most manufacturing plants or factories are distributed in that they consist of heterogeneous, unconnected workstations. The virtue of this factory design is that it provides adaptability to a varying product mix. The drawback is the resulting complexity of operations, management, and quality control.

A distributed manufacturing plant is capable of fabricating a variety of products through ordered-process sequences of process steps. Each process step can be performed by at least one workstation in the factory. Distributed factories are common in the manufacture of modern electronics products. Six types of distributed factories can be involved: wafer slicing, wafer fabrication, semiconductor-component assembly, circuit-board fabrication, circuit-board assembly, electronic-product assembly.

The archetype of a distributed factory is a wafer-fabrication plant, or "wafer fab," which may manufacture products simultaneously according to over one thousand processes, averaging over one hundred steps each. An example of wafer fabrication is described in detail below.

We are now in position to illustrate the complexity of distributed factories. For example, wafer fabrication factories with over one thousand fabrication sequences are known. Such a large collection of processes is difficult to represent in a drawing like a fab graph. Such a factory, however, can be described to a computer system.

The complexity of distributed factories is further illustrated by the existence of tens of thousands of fabrication sequences in a general class of distributed factory called a "job shop." The standard approach to describing the collection of sequences in a job shop is to surrender to the complexity and describe the product paths through the factory as being random. They are clearly not random, but only recently have computers provided the practical computational power to describe highly-complex factories accurately.

The factory is a complex, data- and information-rich entity. A data structure with tens of thousands of parameters may be required merely to describe the factory. Furthermore, in operation a dynamic factory produces orders of magnitude more data describing the production flows. The sheer volume of information has made operation and control of distributed factories a major problem.

MANAGING COMPLEXITY

Despite the large data volumes and the complexity of the problem, factory management and control is still accomplished primarily by manual methods with some assistance in scheduling from software called shop-floor controllers. The shop schedule is in practice determined by the decisions of various production supervisors or foremen, or in some cases by the workers themselves. These decisions are made more or less independently of one another on the basis of the information available to each foreman and in view of his own skills and objectives. The resulting shop schedules are not necessarily those that management would prefer.

Shop-floor schedulers have a very limited function. They attempt to pick the next lot to process from a queue at a work station. The choice typically depends heavily on the due date of the lot and processing time remaining. In general lots which are most behind schedule are given priority, and all lots in a queue may be ranked according to this priority function. The knowledge of the location lots in queues comes from a production tracking system.

There are two general types of shop-floor schedulers: infinite- and finite-loading. Infinite-loading methods are especially simplistic in that they do not consider workstation capacity. Instead a schedule is created using a standard wait time (queue time).

Finite-loading methods consider somewhat more information on the factory. They account for workstation capacity, and do not schedule more work than the workstation can accomplish. However, these techniques are not models and do not account for dynamic factory changes. Consequently, loading plans are typically accurate for at most two days, and then must be laboriously re-calculated.

In attempts to address the problem of optimal factory scheduling, a tremendous theoretical literature on production scheduling has been developed. The result of this work has been to establish that current factory practice is far from optimal and to define the degree of complexity of the factory management issues. Unfortunately, this work has not resulted in practical methods for factory control. In critical reviews, it is constantly re-iterated that all of these methods fail for factories with greater than about ten machines and ten lots.

On the other hand, the world is filled with real factories that operate, however, sub-optimally. Where theory has failed to provide solutions, factories run through thousands of ad-hoc decisions made on the factory floor. Thus, there exists a substantial need for improvement in modeling and control techniques so that they can be of more practical use.

Both scheduling theory and shop-floor loading schemes possess two major structural faults. First they are incapable of recognizing the details of individual factories. In practical scheduling problems, details of operation often determine success or failure. Secondly, both methodologies neglect the dynamic operation of the factory. Unfortunately, it is precisely through the consideration of operational dynamics that human factory managers achieve scheduling solutions.

An indication of the state of the art in modeling and manufacturing control is given by the following surveys: S. S. Panwalkar and W. Iskander, "A Survey of Scheduling Rules", Operations Research, Vol 25, No. 1, January-February 1977, pages 45–61; E. M. Dar-El and R. Karni, "A Review of Production Scheduling and its Applications in On-Line Hierarchical Computer Control Systems," in On Line Production Scheduling and Plant-Wide Control, E. J. Compass and T. J. Williams (eds.), Tech. Publ. Co., Barrington, Ill., 1982, pages 1–25; T. E. Vollman, W. L. Berry and D. C. Whybark, Chapter 5, "Shoop-Floor Control", and Chapter 13, "Advanced Concepts in Scheduling", in Manufacturing Planning and Control Systems, Dow Jones-Irwin, Homewood, Ill., 1984, pages 113–145 and 373—403; E. A. Elsayed and T. O. Boucher, Chapter 7, "Job Sequencing and Operations Scheduling", in Analysis and Control of Production Systems, Prentice-Hall, Englewood Cliffs, N.J., 1985, pages 227–285.

In summary, the prior art approach to modeling and manufacturing control is to start with a theoretical mathematical treatment of the problem and work down to characterize the operation of factories. As a result, the above literature characterizes modeling and manufacturing control as a nonpolynomial (NP) complete problem, which is a measure of problem complexity. Such a characterization means that the run time of the problem increases faster than any polynomial. As a result, classical scheduling theory holds that further research is necessary before such techniques can be used for factories with greater than about ten machines and ten lots, far too low quantities to be useful in integrated circuit fabrication.

In contrast to the theory of sequencing and scheduling, simulation models of factories have been used as a means of schedule generation, and this approach is reviewed in the above literature. In general, schedule generation from models is not viewed as a feasible approach in this literature. The schedule is not meaningful unless the model is accurate. An accurate model is viewed as a labor-intensive special case which is useful for only its target factory. Furthermore, in implementation the model may require a long execution time, making its use in scheduling cumbersome.

One of the reported successes of this approach also illustrates these drawbacks (S. K. Jain, "A Simulation-Based Scheduling and Management Information System for a Machine Shop", Interface, November, 1975, pp. 81–96.) The factory was small: 35 machines, 80 jobs per week, an average of ten operations per job. The simulation developed for schedule generation was the result of intensive professional effort, and it was able to generate schedules no more frequently than eight hours. This slow scheduling response time was only adequate because of the long process times of that factory.

Therefore, both classical scheduling theory and standard simulation modeling have failed to meet the challenge of scheduling real factories. A fundamentally different approach is therefore required to make modeling and manufacturing control truly practical in such complex fabrication processes as are employed in integrated circuit fabrication.

As described above, wafer-fabrication factories are distributed factories with fabrication sequences. Models of wafer fabs have been developed by J. E. Dayhoff and R. W. Atherton, "Simulation of VLSI Manufacturing Areas", VLSI Design, December 1984, pages 84–92. This work focused on the queueing dynamics associated with queues for each distinct process operation (process-step queue). To that end, the dynamics treated in these models was severely restricted, and only strict process sequences were allowed. This prior work contributed to queueing theory, and was useful for theoretical studies of the dynamics of these non-standard queues. In practice, however, such queues are secondary. The standard queue in factories is lots forming a waiting-line at a workstation (workstation queue). The earlier model does not treat workstation queues, and can not treat factory scheduling from such a queue. The factory scheduling rules discussed above all depend strongly on the attributes of individual lots. The earlier model, however, treats process-step queues, but not lots, as fundamental. Lots do not have identity, and key lot attributes such as due date and priority weight are not present. Thus, this model can not treat scheduling rules arising in theory or practice, can not be validated, and can not be used to generate schedules or control a factory.

SUMMARY OF THE INVENTION

Accordingly, it is an object of this invention to provide a method for more tractable management and control of distributed factories having fabrication sequences.

It is another object of the invention to provide such a method which can be used with complex processes, such as integrated circuit manufacture, which require manufacturing plants having large numbers of machines and lots.

It is a further object of the invention to provide such a method which starts with an analysis of actual manufacturing plant operation, rather than a theoretical or mathematical approach.

It is still another object of the invention to provide a process for modeling a manufacturing plant which develops concrete descriptions of specific factories.

It is a still further object of the invention to provide such a modeling process which provides a dynamic model for a distributed factory which has a fabrication sequence.

It is yet another object of the invention to provide such a modeling process which will simulate the behavior of the factory in detail.

It is another object of the invention to provide such a modeling process in which the model is validated with actual operating data for the factory.

It is still another object of the invention to provide such a modeling process in which the model can be used to generate factory schedules using scheduling rules that are evaluated by the model prior to being implemented in the factory.

It is a further object of the invention to provide such a modeling process which characterizes factory operation accurately enough so that the model can be used for automatic control of the factory.

It is yet another object of the invention to provide such a modeling process with automatic control of the factory which includes a computer-integrated manufacturing production control system.

It is another object of the invention to provide such a modeling process that will provide sizing data for determining equipment and other resource needs for the factory.

The attainment of these and related objects may be achieved through use of the novel process for modeling and controlling a manufacturing plant herein disclosed. In one aspect of the invention, a modeling process in accordance with this invention includes delineating a set of factory operating rules which define how part lots interact with machines in actual operation of the plant. The manufacturing plant is defined by specifying machines in the plant and at least batch size and processing time parameters of each machine. Products manufactured in the plant are defined. Fabrication sequences consisting of process steps are provided for the products manufactured in the plant. The process steps are assigned to the machines. At least time and yield characteristics of each process step are defined. Those phenomena in the manufacturing plant which are stochastic in nature are identified. Distributions and parameters of the distributions are assigned to the stochastic phenomena.

The model obtained by this process is used to simulate operation of the manufacturing plant. Predictions obtained with the simulation are compared with observed manufacturing trends in the plant. The comparison is used to refine choice of fundamental rules and parameters in the model.

The present invention provides an algorithm for factory description and specification. The algorithm develops concrete descriptions of specific factories. Described below is a class of dynamic models for distributed factories which have fabrication sequences. The first step in the algorithm is to choose one dynamic model from this class. In terms of this specimen model the factory is defined by its machines, products, fabrication sequences, collections of job sets, scheduling rules, and machine reliability parameters. The second step is to determine the parameters that describe the specific factory. These parameters are defined in terms of data structures of the individual factory model. The factory-specific model contains descriptions of the dynamic interactions of lots and machines; thus, the behavior of the factory can be simulated in detail. The third step is to simulate the dynamic behavior of the factory.

This invention provides a standard class of specimen models for distributed factories which have fabrication sequences. Members of this class are called sequenced-dynamic-factory (SDF) models. The class is defined by sets of fundamental rules for the definitions of fabrication sequence, queues, scheduling rules, batching, set-up times, yield, reliability, and other variables. A choice of rules from each set defines an individual model.

The invention provides factory-specific models for distributed factories which have fabrication sequences. A model describing actual operation of the factory is obtained. An individual model from the class above is chosen; the choice is based upon the match between the dynamic characteristics of the model and those of the factory. The parameters describing the factory's products, fabrication sequences, and machines are determined. The parameters describing such rules as equipment reliability are established from factory-specific production data provided (for example, by a computer-integrated manufacturing (CIM) production-control system that tracks lot movement, work in process, and equipment status). The model is validated by use of material movement data from the CIM system.

A factory-specific model obtained with this invention can overcome both of the objections to conventional scheduling theory and shop-floor loading schemes; it can treat the specific details of individual factories and it can consider complex information flows resulting from the dynamics of factory operation. Furthermore, the factory model can generate feasible schedules in the same way as successful factory managers.

The present invention provides the generation of factory schedules from the factory-specific models for distributed factories which have fabrication sequences. The schedule lists lot movements and machine loadings.

The factory-specific model contains the scheduling rules of the factory and it simulates the detailed behavior in time of the factory. After initialization with the state of the factory, the simulation calculates and lists the lot movement and machine loadings for the indicated planning horizon. Furthermore, the scheduling rules can be evaluated by the model prior to being implemented in the factory.

The invention provides for use of the factory-specific model for the automatic control of the factory including feed-back and feed-forward control of lot movements, machine loadings, and processing. The CIM system provides data on the performance of the factory to the schedule generated above. The factory may deviate from the schedule due to random events like equipment failure or the loss of a lot, or unplanned events like a new product order. The factory-specific model generates control actions for the factory so that the perturbations in desired factory behavior due to unexpected events are minimized.

This invention provides for a computer-integrated manufacturing production control system which incorporates a factory-specific model for automatic control. The factory-specific model can also to provide sizing data for the design of the computer-integrated manufacturing (CIM) production-control system. The model provides simulated results on material movements, queue sizes, factory transactions, and other information. Such simulated results are necessary to size computers, communications networks, data bases and other aspects of the computer system for manufacturing control.

Because the modeling process of this invention starts with a definition of how a manufacturing plant actually operates, rather than a mathematical theory which ultimately leads to a definition of the plant operation, this modeling process is able to handle very complex manufacturing plants and processes, such as those used in the manufacture of integrated circuits. However, the results obtained with his process should make it of use in a wide variety of other manufacturing plants and processes as well.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

The following nonlimiting examples represent preferred embodiments of the invention and describe the invention further.

EXAMPLE 1: Machine Shop

Figure 1:
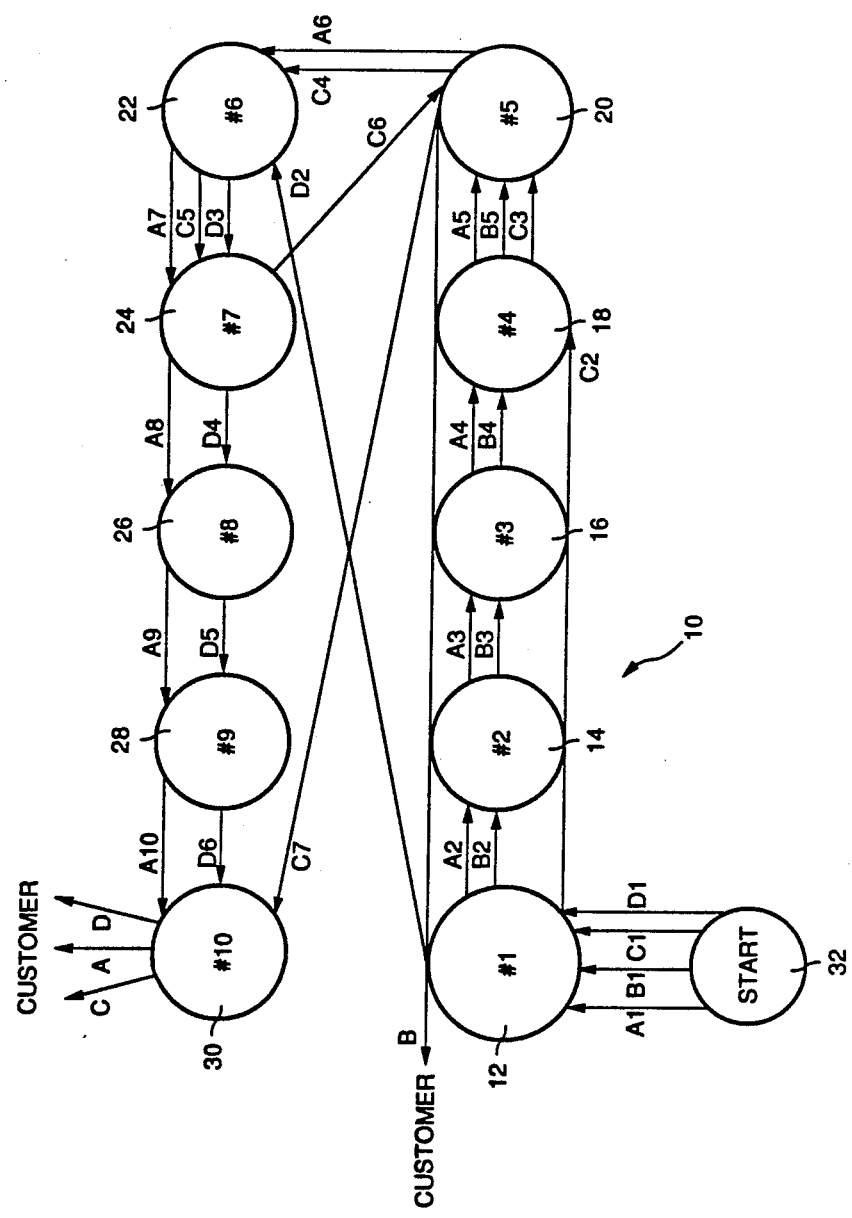
FIG. 1 is a flow diagram in the form of a directed multigraph, showing fabrication sequences representative of a first embodiment of the invention.

Turning now to the drawings, more particularly to FIG. 1, there is shown a machine shop 10, with ten workstations 12-30, labeled as #1-#10, and four fabrication sequences A1-A10, B1-B6, C1-C7 and D1-D6. The convention used in this directed multigraph is that directed arcs indicate a transition from one process step to another and that the process step is performed at the workstation at the end of the arc. Thus, start 32 is present only as a convenience prior to the beginning of the sequence. The process sequences consist of all the arcs from start to completion. Table 1 below shows important characteristics of each workstation 12-30. The column headed Set-up Parameter gives a time in the same units as process time to account for changes in the machines that are necessary for different products and-/or process conditions in operation of the machine shop.

TABLE 1

Workstations in a Machine Shop

| Label | Type | # Machines | Load Size | Set-up Parameter |
|---|---|---|---|---|
| 1. | Cleaning | 5 | 1 | .01 |
| 2. | Centering | 2 | 2 | .25 |
| 3. | Turning | 3 | 1 | .5 |
| 4. | Milling | 4 | 1 | .25 |
| 5. | Drilling | 4 | 2 | .15 |
| 6. | Shaping | 5 | 1 | .25 |
| 7. | Treatment | 2 | 4 | .15 |
| 8. | Grinding | 4 | 1 | .15 |
| 9. | Finishing | 6 | 1 | .15 |
| 10. | Cleaning | 5 | 1 | .01 |

A number of products may be associated with each fabrication sequence. Each product is differentiated by a change in the process-step parameters for one or more steps. While this diagram is becoming complex with only four fabrication sequences, real-world machine shops may have over one thousand. This real world complexity has prevented accurate representation of the fabrication sequences. This problem is surmounted by this invention. While we can not usefully draw such a fab graph, the computer can input, store, and compute with a mathematical representation of the 1000 fabication sequences.

EXAMPLE 2: Wafer Fabrication

Figure 2:
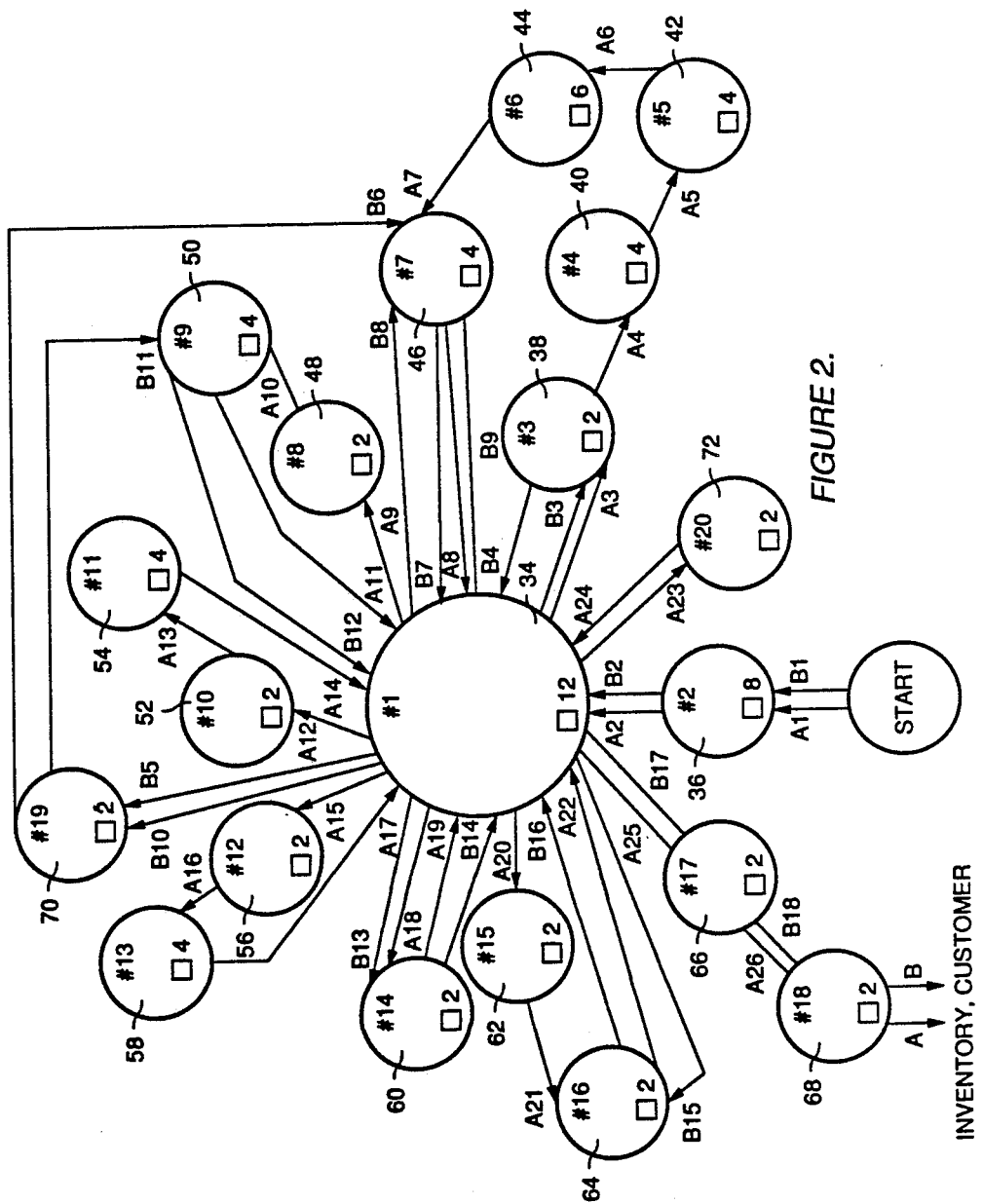
FIG. 2 is another flow diagram in the form of a directed multigraph, showing fabrication sequences representative of a second embodiment of the invention.

FIG. 2 provides a representation of two simplified semiconductor wafer fabrication processes. Fabrication sequences A1-A26 and B1-B18 have respectively 26 and 18 steps. Twenty workstations 34-72, labeled #1-#20 are shown. In this drawing the number of machines at each work station is indicated. Again we have reached the limit of practical pictorial representation with a simple example. Each fabrication sequence may have dozens of products. Real semiconductor fabrication sequences may have 250 process steps using 50 workstations and 200 pieces of equipment. The two fabrication sequences A1-A26 and B1-B18 are for building integrated circuits on the surface of a silicon wafer. Fabrication sequence A1-A26 is a simplified bipolar process, and fabrication sequence B1-B16 is a simplified metal-oxide-silicon (MOS) process.

An integrated circuit is implemented as a three-dimensional micro-structure on the surface of a single-crystal silicon. Each wafer serves as the site for the fabrication of hundreds or even thousands of integrated circuits, such as memories. Each fabrication sequence consists of four general categories of process operations: deposition, patterning, etching, and doping. Circuit elements, such as transistors, capacitors, and resistors, are formed in layers of five or more different materials including dielectrics, conductors, and semiconductors. These layers, low-defect thin films, are deposited to thicknesses less than three microns by a variety of techniques, such as chemical-vapor deposition, sputtering, or plasma-assisted deposition.

At each layer, the two-dimensional structure of the device is fabricated by sequential steps of patterning and etching. The patterning process involves applying an organic resist, irradiating the resist through a mask, and removing the positive or negative image. The etching process involves either liquid-phase dissolution (wet-etching) or gas-phase reactions (dry etching). The remaining class of process steps is doping; in current manufacturing this step is usually performed using ion-implantation.

In the process sequence variations of these four steps are repeated for each material layer. Each process operation is performed by specialized equipment. Equipment is grouped into workstations of like machines. Workstations may perform more than one step in a single process sequence or process steps in more than one sequence.

An asociation of the two process sequences with workstations is shown in FIG. 2. Each circle 34-72 represents a workstation; each arrow represents a transition from one process step to another. The process sequence is the complete path (or flow) over the set of workstations. This diagram is a type of directed multigraph, called a fab graph. Further details on the workstations 34-72 are presented below in Table 2.

TABLE 2

Workstations for Wafer Fabrication

| Label | Machine Type | # Machines | Load | Set-Up Parameter |
|---|---|---|---|---|
| 1. | Masking | 12 | 25 | .2 |
| 2. | Oxide Furnace | 8 | 50 | .3 |
| 3. | Film Spinner | 2 | 25 | .15 |
| 4. | Diffusion Furnace | 4 | 50 | .3 |
| 5. | Wet-Etch | 4 | 25 | .15 |
| 6. | Epitaxy | 6 | 20 | .5 |
| 7. | Oxide Furnace | 4 | 50 | .3 |
| 8. | Deposition | 2 | 50 | .25 |
| 9. | Diffusion Furnace | 4 | 50 | .3 |
| 10. | Deposition | 2 | 50 | .3 |
| 11. | Diffusion Furnace | 4 | 50 | .3 |
| 12. | Deposition | 2 | 50 | .3 |
| 13. | Diffusion Furnace | 4 | 50 | .3 |
| 14. | Metal Deposit 1 | 2 | 30 | .2 |
| 15. | Diffusion Furnace | 2 | 50 | .3 |
| 16. | CV Deposition | 2 | 50 | .3 |
| 17. | Bake Furnace | 2 | 50 | .15 |
| 18. | Prober | 2 | 25 | .2 |
| 19. | Ion-Implanter | 2 | 25 | .5 |
| 20. | Metal Deposit 2 | 2 | 50 | .3 |

EXAMPLE 3: Wafer Sort

Figure 3:
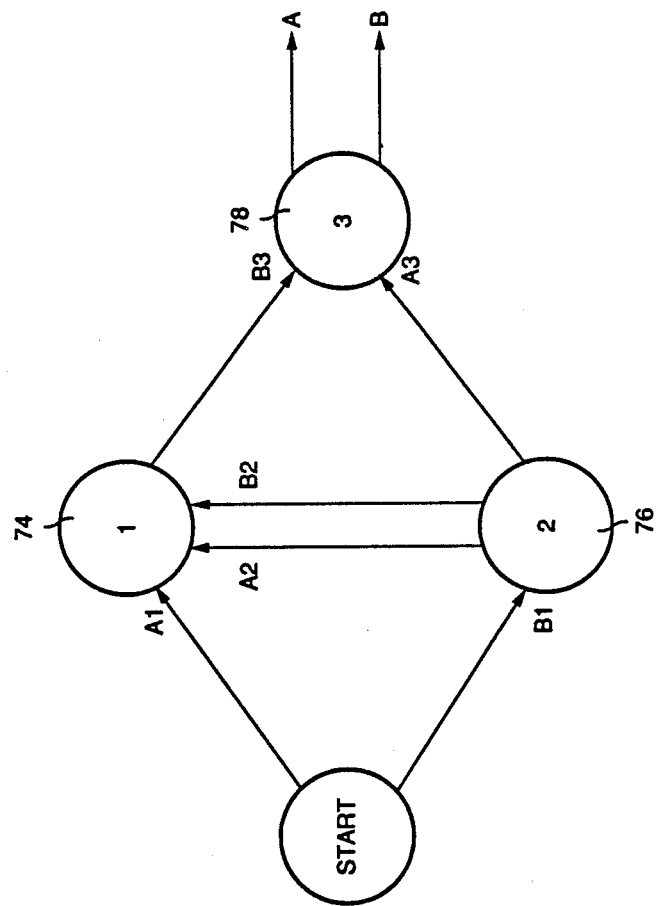
FIG. 3 is a further flow diagram in the form of a directed multigraph, showing fabrication sequences representative of a third embodiment of the invention.
Figure 4:
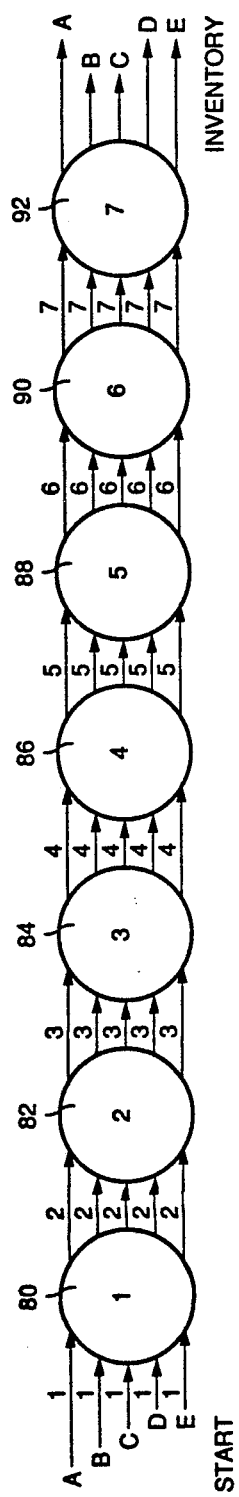
FIG. 4 is another flow diagram in the form of a directed multigraph, showing fabrication sequences representative of a fourth embodiment of the invention.
Figure 5:
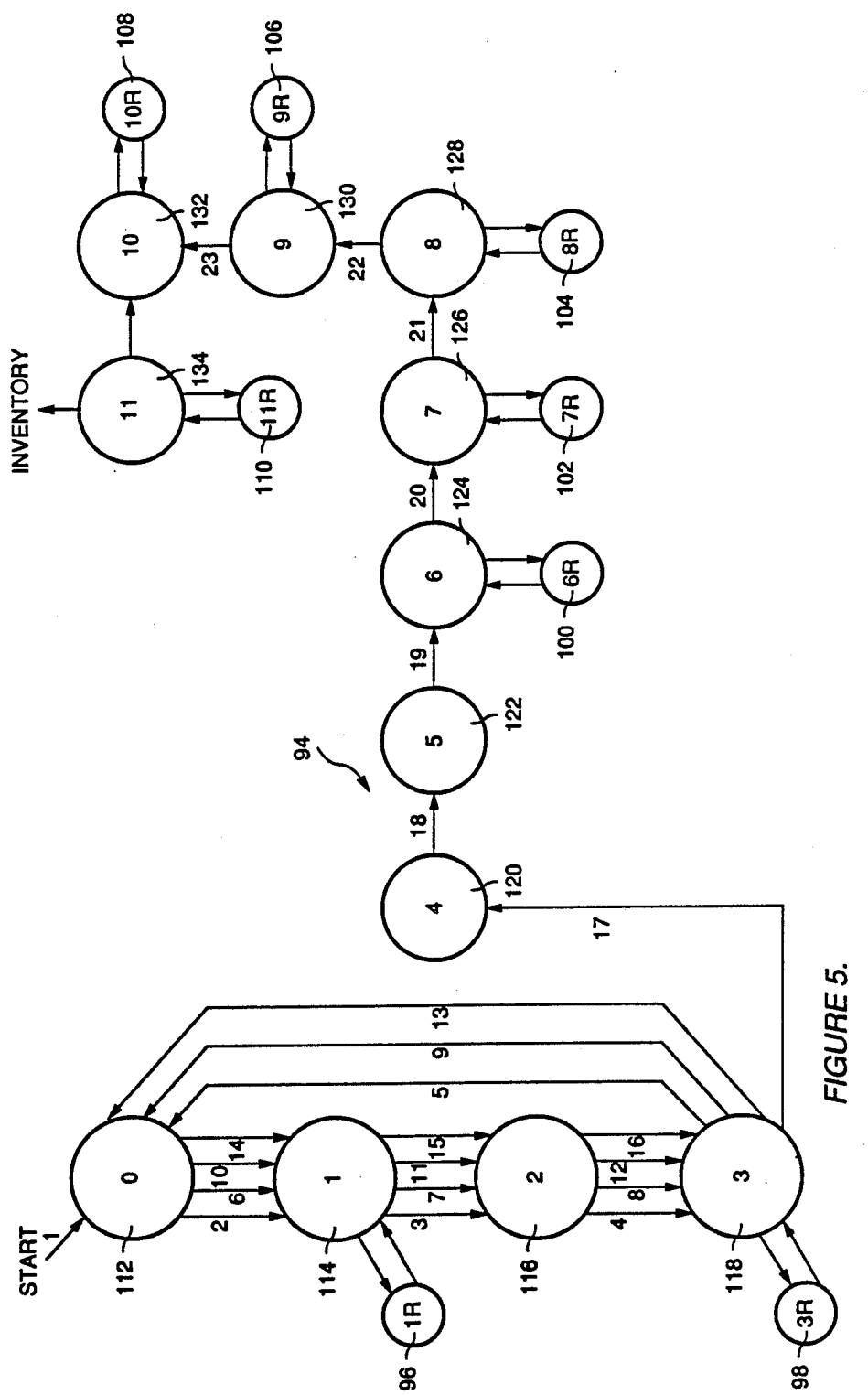
FIG. 5 is still another flow diagram in the form of a directed multigraph, showing fabrication sequences representative of a fifth embodiment of the invention.

Wafer sort, shown in FIG. 3, illustrates the case where a pair of process steps 74 and 76 may be interchanged to give an equivalent fabrication sequence.

Since parametric test 74 and functional test 76 may be done in either order, the two process sequences A1–A3 and B1–B3 shown are equivalent. In wafer fabrication such process sequences allow no changes in the order of steps. Loosely constrained order of steps is common in machine shops. The three process steps 74, 76 and 78, labeled 1–3 in FIG. 3, are identified in Table 3 below.

TABLE 3

Workstations for Semiconductor Component Test (Wafer Sort)

1. Parametric Test
2. Functional Test
3. Wafer Sort

EXAMPLE 4: Semiconductor Component Assembly

In this example the path followed by fabrication among the workstations is simple. Five identical process sequences A1–A7 through E1–E7 are shown; however, each process step has different parameters. This example might be viewed as an extreme example of one process flow and four attached product flows. The seven workstations 80–92, labeled 1–7, are identified in Table 4 below.

TABLE 4

Workstations for Semiconductor Component Assembly

1. Wafer Saw
2. Die Attach
3. Die Bond
4. Mold & Cure
5. Inspect/Test
6. Functional Test
7. Mark & Pack EXAMPLE 5: Circuit Board Fabrication This fabrication sequence 94 is marked by extensive opportunities for re-work. Each workstation 96–110 labeled "R" indicates the beginning and end of a possible re-work subsequence of process steps. Not shown are feedback flow paths from the rework workstations 96–110 to earlier workstations 112–134. The workstations 112–134, labeled 0–11, are identified below in Table 5.

TABLE 5

Workstations for Circuit Board Fabrication

Figure 6:
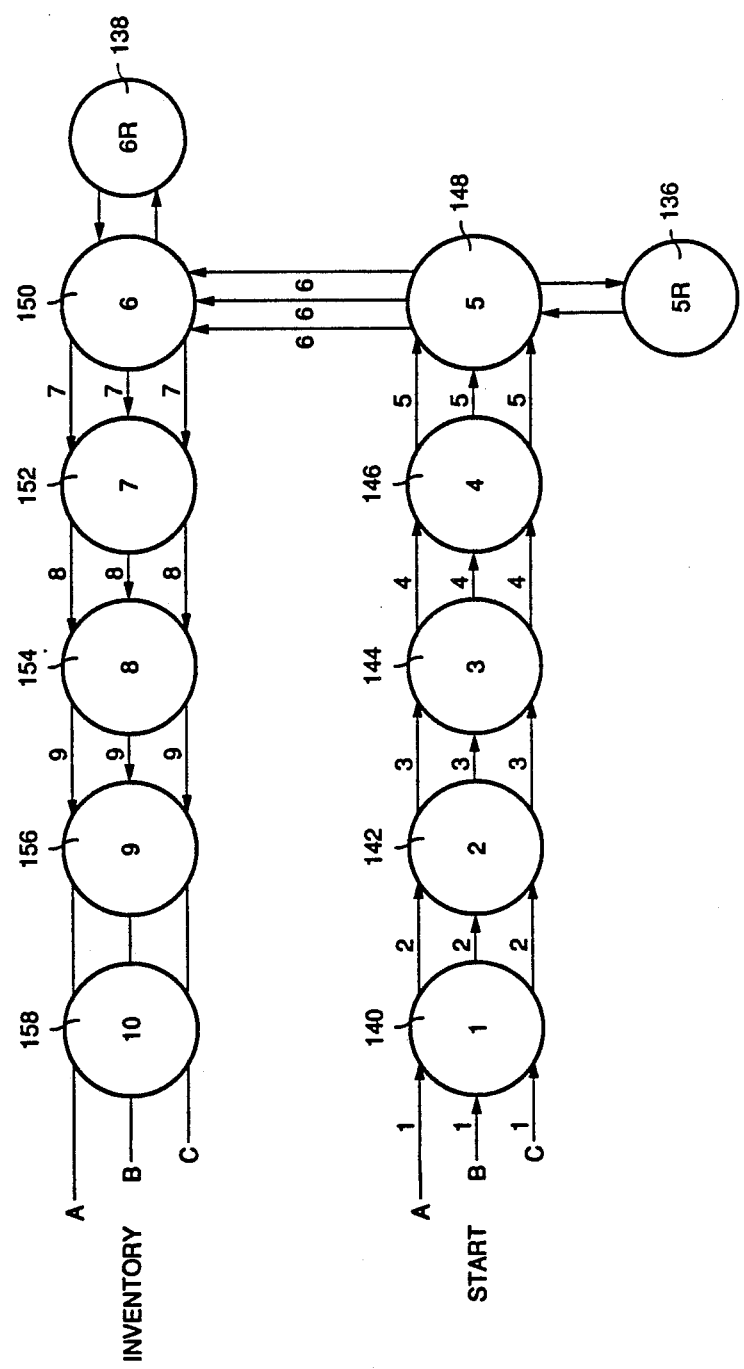
FIG. 6 is yet another flow diagram in the form of a directed multigraph, showing fabrication sequences representative of a sixth embodiment of the invention.

0. Layer Fabrication
1. Pattern
2. Etch
3. Inspect
4. Laminate
5. Drill
6. Smear Removal
7. Pattern
8. Electroplate
9. Edge-Connector
10. Board Contouring
11. Test & Inspect Example 6: Electronic System Assembly FIG. 6 shows electronic system assembly with three fabrication sequences A1–A10 through C1–C10. Not shown are the different material requirements for each sequence. This is a simple basic flow, but it contains the opportunity for re-work loops at workstations 136 and 138. The workstations 140–158, labeled 1–10, are identified below in Table 6.

TABLE 6

Workstations for Electronic Systems Assembly

1. Circuit Board Inspection
2. Circuit Board Tester
3. Auto Insertion (Components)
4. Manual Insertion (Components)
5. Solder
6. Visual Inspection
7. Electrical Test
8. Sub-System Assembly
9. System Assembly
10. System Test 1. Algorithm for Sequential-Distributed Factory Description and Specification Described below is a class of dynamic models for distributed factories which have fabrication sequences. The first step in the algorithm is to choose one dynamic model from this class. In terms of this specimen model the factory is defined by its machines, products, fabrication sequences, collections of job sets, scheduling rules, and machine reliability parameters. The second step is to determine the parameters that describe the specific factory. These parameters are defined in terms of data structures of the individual factory model. The factory-specific model contains descriptions of the dynamic interactions of lots and machines; thus, the behavior of the factory can be simulated in detail. The third step is to simulate the dynamic behavior of the factory.

2. Standard Class of Sequential-Dynamic-Factory Dynamic Models.

For this invention, the factory is described in terms of discrete entities such as machines, attributes such as load size, and activities such as machine unload or re-load. Associated with each entity are data-structures; the collection of all such data structures provides the factory system image. The state of the factory at any point in time is given by the values of the parameters of all such entity data-structures.

In this invention, series of simulated events change the factory state, and thus, the system image. These changes, associated with the performance of the factory, are tracked. Details or summaries of the performance variables describe the behavior of the factory as a result of the simulated-event scenario.

In this embodiment, the fundamental physical entities in the factory are machines (pieces of equipment), and lots (jobs). The fundamental informational entities are fabrication sequences, groups of machines called workstations, and queues. The fundamental dynamics are governed by the interactions of lots with machines, grouped in workstations. Lot movements through the workstations are determined by the fabrication sequences. There is a hierarchy of fabrication sequences, and the assignment of a sequence to lot may be dynamic.

In this embodiment the factory dynamics are determined by the lot-sets (which may be dynamic or static), machine process times, setup times, yields, batching operations, and equipment failure and repair. A detailed description of these entities follows:

Lots

Lots are composed of like parts and follow a fabrication sequence. The assignment of a lot to a fabrication sequence may be static or dynamic. In this embodiment the attributes of lots include fabrication-sequence parameters (which define allowable process flows), start-time, part-count, current process step, current workstation and machine, due-time, priority weight, and action time. In the general form of the invention, other attributes may be of interest. Lots are sometimes called "jobs". Lot-size or part-count is a key variable in the interaction of lots with machines; see "batching" below. Beginning with an initial lot-size, the part-count may decrease due to yield losses (defined below) at process steps. The lot-set is the total collection of lots assigned to the factory for a time interval. The population of this set may be static or dynamic.

Machines and Workstations

Workstations are groupings of like machines. Workstations contain at least one machine. In this embodiment the attributes of machines include batch-size, standard operating time to maintenance, standard time of maintenance, and parameters of distributions describing sporadic failure and repair. In the general form of the invention, machine-specific set-up parameters and other attributes may be defined. In this embodiment each workstation is qualified to perform only a specified set of process steps or operations; the population of this set may be dynamically defined.

Process Steps

The process step is the fundamental operation performed on a machine. In this embodiment, the attributes of each process step include a process time, a vector of parameters describing conditional setup times, a standard yield, and parameters for distributions describing random yield and process-time fluctuations. Each process step is associated with a set of qualified workstations.

Fabrication Sequences

A fabrication sequence is a sequence of process operations that are required to complete a product. In this embodiment there is hierarchy of fabrication sequences, and fabrication sequences may be altered dynamically. A process flow is a restricted class of fabrication sequence. In a process flow, each of the ordered sequence of process steps is assigned to a workstation. A process-flow group is a set of closely related process flows. A set of product flows may be associated with each process flow. Each product flow is a minor variation of the basic process flow. In this embodiment, allowable variations include changes in the attributes of small set of process steps and the addition or deletion of one or more process steps. Use of product sequences allows process tailoring in that minor changes of process steps and process sequence may define a specific product flow. Major deviations require defining a new process sequence. In a more general form, a more extensive hierarchy of fabrication sequences may be defined. In this embodiment, some fabrication sequences may be weakly constrained: the interchange of certain steps results in an equivalent fabrication sequence. Each interchange and/or assignment of process steps to workstations results in a distinct process sequence. However, these process sequences may be equivalent in that they fabicate the same product. As a given lot that is assigned to fabrication sequence moves through the factory, it may be dynamically reassigned to any equivalent process sequence. In this embodiment, rework also results in dynamic changes in process sequences. In rework, certain lots may repeat a single process step or sub-sequence of steps.

Yield

Yield is a measure of the imprecision of manufacturing operation. In this embodiment, the following models for yield are defined. In the simplest yield model, each operation successfully processes a standard fraction, yield, of parts in each lot. In a refinement, yield becomes a random variable, the parameters of whose distribution can be defined by each process step. In a second refinement a distinction is made between single-part machines and batch machines. In single-part machines each part has a probability of failed processing. In batch processing each batch may have a probability of failure. Each workstation may use a different yield model. In a more general embodiment other yield models may be defined.

Machine Availability

A machine is available if it is capable of processing. It becomes unavailable as a result of planned downtime of a fixed duration due, for example, to preventive maintenance. A machine may also become unavailable as a result of unplanned, random failures, which require a repair of random duration. In the general invention, sporadic failure and repair can be modeled by probability distributions.

Batching

A batch is the number of parts loaded into a machine for simultaneous processing. The maximum batch is the load-size of the machine. The lot-size may be less than, equal to, or greater than the load-size. These three cases require the definition of batching rules, which can significantly affect the dynamics of lot movement. Some examples of batching rules are given below.

Mixed-lot batches are batches composed of parts from different lots. Mixed-lot batches may or may not be allowed at each process step. Batching-up means loading two or more lots into one batch for large load sizes. A modification of this rule requires defining the specific wait-time which is required for sufficient lots to complete the batch. The wait may be zero, in which case many batches may be significantly less than the load-size. A second modification is the decision on alowing mixed-lot batches. Batching-down involves breaking a lot into batches, when the lot-size excedes the load-size. The last batch may be significantly smaller than the load-size, thus requiring a mixed-lot rule. In dynamic lot management lots with the same product attributes are merged or split for processing convenience and minimization of set-up time. In a more general form of the invention, specific batching rules eliminate the need for dynamic lot-management.

Set-up Time

Set-up time is the time required to prepare the machine for processing. Set-up time for a machine is conditional on the previous lot processed by that machine. Different set-up times are associated with changes in process step, product, and process sequence.

Queues

Lots which are not in machines being processed are in waiting-lines or queues. Queues may be defined in a variety of ways: by machine, by workstation, by process step, by process and by product, and so forth. The definition of queues and the assignment of lots into queues does not change the inventory, but only its classification. Different queue assignments may be appropriate depending on the scheduling rule being applied.

Scheduling Rules

The existence of inventory and queues requires dispatch, priority, or scheduling rules to determine which lot to process next. Over one hundred scheduling rules have been catalogued in the above-referenced S. S. Panwalkar and W. Iskander paper. Additional rules are limited only by the imagination of factory managers. Complex scheduling rules may require a large set of parameters describing the attributes of lots and machines and the status of queues.

Implementation in terms of a an algorithm for computation: The model structure has been defined above in terms of entities, attributes, and fundamental rules. The model can be implemented as a concrete computer algorithm by using the technique of discrete-event simulation (G. S. Fishman, Concepts and Methods in Discrete Event Digital Simulation, Wiley, New York, 1973; J. A. Payne, Introduction to Simulation, McGraw-Hill, New York, 1982.) The algorithm can be defined as follows: Data structures are defined for each entity and its attributes. Events are defined which follow the fundamental rules of the model. As a consequence of the fundamental rules, events occur which change the system state. The changes are tracked. As a consequence of the occurence of events, new events are scheduled. An event-scheduler sorts and orders all scheduled events. The simulation is initialized by the occurrence of initial events and moves forward in time by performing the next scheduled event. The system time clock moves forward in discrete increments as required by the next event. The simulation ends when the predefined final time is reached.

Factory System Image

The factory system image provides the state of the factory at any point in time. The system image is given by the values of all attributes of all entities defining the factory. The entities and attributes are arranged into tables. Each table is composed of data structures built from linked lists. The following tables are present in the system image. Other tables may be included in the general invention. Lot Table: Set of linked-lists detailing lot properties. Machine Table: Set of linked-lists detailing machine properties and workstation assignments. Fabrication Sequence Table: Set of linked lists detailing fabrication paths including information on process steps. Queue Table: Set of linked-lists giving queue structure. Event Table: Set of linked-lists detailing all scheduled events. System Performance Table: Set of linked-lists containing summaries of factory performance.

Events

Each event causes changes in the system-image tables affected by that event.

Start a lot: A lot is initialized and becomes active in the factory. It is assigned to a process sequence from its fabrication sequence and moves to a queue at the workstation of its first process operation.

Move a lot: After completion of processing at a workstation, a lot moves to the workstation assigned to the next process step in the process sequence.

Load a machine: Following batching and scheduling rules, a machine is loaded from one of the queue or queues assigned to its workstation.

Unload a machine: A machine is unloaded. If its lot is complete, it is returned to the list of available machines.

Machines fails: Machine becomes unavailable. A repair time is scheduled.

Reassign process sequence: A lot is reassigned from its current process sequence to a second process sequence from its fabrication sequence.

In another form of the invention, other events may be defined.

Implementation in Computer Software

In this embodiment the algorithm, an SDF dynamic model, is written in a high-level computer language such as Fortran, Pascal, PL/I, or the like. The general embodiment includes any implementation in assembly language, a higher-level language, or a simulation language.

3. Factory-specific Models for Distributed Factories which Have Fabrication.

An individual model from the class above is chosen; the choice is based upon the match between the dynamic characteristics of the model and those of the factory. The parameters describing the factory's products, fabrication sequences, and machines are determined. The parameters describing such dynamic rules as equipment reliability are established from factory-specific production data provided (for example, by a computer-integrated manufacturing (CIM) production-control system that tracks lot movement, work in process, and equipment status). The model is validated by use of material movement data from the CIM system. Defined above is a class of models for distributed factories which contain fabrication sequences. In this section a specified model from this class is given for a wafer-fabrication factory with ten processes and up to ten products associated with each process.

The system modeled is the entire wafer-fabrication plant, or "fab". The fab is described in terms of wafer-processing equipment, wafer lots, process sequences, and product sequences. Data-structures are associated with each entity, and the system image or system state at any point in time is given by the values of all such entity data-structures.

Lots

Lots are composed of wafers and follow a specified process and productflow. The attributes of lots include start-time, process, product, part-count, current process step, current workstation and machine, due-time, priority weight, and action time. The lot-set is fixed or static.

Machines and Workstations

Workstations are composed of like machines. The attributes of machines include batch-size, standard operating time to maintenance, standard time of maintenance, and parameters of distributions describing sporadic failure and repair. Each workstation is qualified to perform only specified set of process steps or operations.

Process Steps

The process step is the fundamental operation performed on a machine. The attributes of each process step include a process time, a vector of parameters describing conditional setup times, a standard yield, and parameters for random yield distributions. Each process step is assigned to a workstation.

Process

The process flow is the ordered sequence of process steps required to complete fabrication. A process sequence may have as many as 250 steps.

Product

A set of one or more products is associated with each process. Process tailoring is allowed in that minor changes of process steps and process sequence may define a specific product flow. Major deviations require defining a new process. The specific changes allowed are as follows: The parameters of up to five process steps may be changed. A single sequence of up to five steps may be added or deleted as long as the limit of 250 steps is not exceded.

Dynamic fabrication Sequences

With the exception of re-work defined below, dynamic fabrication sequences are not allowed. Specifying the process and product completely defines the fabrication sequence.

Equipment Availability

Parameters are provided for scheduled equipment maintenance. Sporadic failure is modeled by exponential distributions for time to failure and time to repair with different parameters for each work station.

Scheduling Rules

Queues are primarily associated with work stations. Lots are processed on first-in, first-out basis. Over-riding this priority are "hot-lots" associated with up to six products. The class of hot-lots are processed in preference to regular lots. Within the hot-lot class lots closest to completion are given priority.

Batching

Mixed-lot batches are not allowed. In batching-up, a maximum wait equal to one-half the process time is allowed to complete the batch.

Set-up Time

Set-up time is the time required to prepare the machine for processing. Set-up time is conditional on the previous lot processed by the machine. Different set-up times are associated with changes in process step, product, and process sequence.

4. Generation of factory schedules from the factory-specific models for distributed factories which have fabrication sequences.

The schedule lists lot movements and machine loadings. The factory-specific model contains the scheduling rules of the factory and it simulates the detailed behavior in time of the factory. After initialization with the state of the factory, the simulation calculates and lists the lot movement and machine loadings for the indicated planning horizon.

5. Use of the factory-specific model for the automatic control of the factory including feed-back and feed-forward control of lot movements, machine loadings, and processing.

The CIM system provides data on the performance of the factory to the schedule generated above. The factory may deviate from from the schedule due to random events like equipment failure or the loss of a lot, or unplanned event like a new product order. The factory-specific model generates control actions for the factory so that the perturbations in desired factory behavior due to unexpected events is minimized.

6. Computer-integrated manufacturing production control system which incorporates a factory-specific model for automatic control.

Given a model that produces an accurate simulation of the manufacturing plant, computer control of the operation of that plant becomes possible with the model. Without an accurate stimulation, human intervention between the outputs of the model and equipment operation is required.

7. Use of a factory-specific model to provide sizing data for the design of the computer-integrated manufacturing (CIM) production-control system.

The model provides simulated results on material movements, queue sizes, factory transactions, and other information. Such simulated results are necessary to size computers, communications networks, data bases and other aspects of the computer system for manufacturing control.

Attached hereto and forming a part of this specification is an Appendix, comprising a source code listing written in Fortran 77 with comments, showing an implementation of a model in accordance with the invention.

It should now be readily apparent to those skilled in the art that a modeling and control process capable of achieving the stated objects of the invention has been provided. The invention gives a realistic, validatable, model for wafer fabrication factories. The invention also gives a realistic validatable model for the other types of factories in the electronics industry. Each of these factory models is a subset of the wafer fab model. The invention gives a realistic, validatable model for distributed factories in general, sometimes referenced as "job shops". Such models are a subset of the fab model. The model can be used to control material movement in the factory, including scheduling. The invention permits a CIM system that includes model-controlled lot-movement and machine loading. The model can be used for aggregate planning. The model can further be used for the design and sizing of a CIM system. While the prior art discussed above indicates that modeling and control of manufacturing plants is, in general, too complex for practical implementation because of the large amounts of computation required with the prior art approaches, the present invention simplifies the computations involved sufficiently so that software implementing the invention can be run on a personal computer, such as an IBM PC.

It should further be apparent to those skilled in the art that various changes in form and detail of the invention as shown and described may be made. It is intended that such changes be included within the spirit and scope of the claims appended hereto.

RM/FORTRAN Compiler (V2.00A)
Source File: FABSIM.FOR

```fortran
 1          PROGRAM FABSIM
 2  C       THIS PROGRAM MODELS WAFER-LOT MOVEMENT AND
 3  C       MACHINE INTERACTIONS, PROVIDES DETAILED
 4  C       BEHAVIOR INCLUDING MACHINE SCHEDULES
 5  C
 6  C       REV. 1.0        18 AUGUST 1986
 7  C       MAIN PROGRAM
 8  C       WAFER FABRICATION DYNAMICS SIMULATION
 9  C
10          REAL DTIME
11          INTEGER*2 OCY,TOT
12          CHARACTER*12 PRBDES, LOTST, FABDES, PRODES(5)
13          INCLUDE 'COMRAM.FOR'
14          INTEGER*2 WSN(50), MACH(50), BS(50), WSMX, MACHX(1000),WSMACH(50),
15       1            MSTAT(1000), MTOT, PROCES(100,5), STPNUM(5), NUMPR,
16       2            HUBNO(50,5), HUBNOX(50,5), HUBPR(100,5),HUBNOY(50),
17       3            IP(300),IPS(300),WSL(300),IPART(300),MSTRT(5),
18       4            LOTSZ(5),IXLOT,ETYPE(1000),BLNK(1000),MWLOT(1000),
19       5            EHD,ETL,ETLM,ALNK(300),TOTL(5),LHEAD,
20       6            QLOT(300), QPH(100,5), QPT(100,5), QKNT(100,5)
21          REAL FT,RT,SHOR,SETUP, PROTIM, YIELD, ST,AT,TINT,TSTRT,ETIME,
22       1            TIMEX,DT, MAINT, CUM,REST
23          DIMENSION FT(50), RT(50), SETUP(100,5), PROTIM(100,5),
24       1            YIELD(100,5), ST(300), AT(300), ETIME(1000),DT(300),
25       2            TINT(5), MAINT(1000),CUM(100,5),REST(100)
26  C
27          COMMON WSN,MACH,BS,MACHX,MSTAT,WSMACH,WSMX,MTOT,FT,RT
28          COMMON ETYPE,BLNK,MWLOT,EHD,ETL,ETLM,ETIME, MAINT
29          COMMON TIMEX, SHOR, TSTRT, TINT, MSTRT, LOTSZ, TOTL
30          COMMON PROCES,STPNUM,NUMPR,SETUP,PROTIM,YIELD,CUM,REST
31          COMMON HUBNO,HUBNOX,HUBPR,HUBNOY
32          COMMON ALNK,IP,IPS,WSL,IPART,ST,AT,IXLOT,DT,LHEAD
33          COMMON QLOT,QPH,QPT,QKNT
34          WRITE (*,100)
35          WRITE (*,110)
36          WRITE (*,120)
37          WRITE (*,130)
38    100 FORMAT (' WAFER FABRICATION DYNAMICS SIMULATION SYSTEM')
39    110 FORMAT (' COPYRIGHT, IN-MOTION TECHNOLOGY, 1986')
40    120 FORMAT (' ***************************')
41    130 FORMAT ('                             ')
42  C
43  C       PROGRAM USES NESTED INPUT FILES
44  C       REQUESTS NAME OF PROBLEM DESCRIPTION FILE
45          WRITE (*,1000)
46   1000 FORMAT (' NAME OF PROBLEM DESCRIPTION FILE')
47          READ (*,*) PRBDES
48          WRITE (*,1010)
49          WRITE (*,*) PRBDES
50   1010 FORMAT (' NAME OF PROBLEM DESCRIPTION FILE' )
51  C
52          READ (*,*) DTIME
53          WRITE (*,*) DTIME
54  C
55          NU=1
56          OPEN (NU,FILE=PRBDES)
57          READ (NU,*) FABDES
58          WRITE (*,1040)
59          WRITE (*,*) FABDES
60  C
61          READ (NU,*) NUMPR
62          WRITE (*,*) NUMPR
63          WRITE (*,1040)
```

```
 64           DO 1020 K=1,NUMPR
 65              READ (NU,*) PRODES(K)
 66              WRITE (*,*) PRODES(K)
 67     1020 CONTINUE
 68           READ (NU,*) LOTST
 69           WRITE (*,*) LOTST
 70           READ (NU, 1030) SHOR,TSTRT
 71           WRITE (*,*) SHOR,TSTRT
 72     1030 FORMAT(2F8.2)
 73              CLOSE (NU)
 74     1040 FORMAT (' NAME OF FAB DESCRIPTION FILE')
 75  C
 76           CALL WKINP(FABDES)
 77           DO 2000 I=1,WSMX
 78           WRITE (*,*) WSN(I), MACH(I), BS(I), FT(I), RT(I)
 79     2000 CONTINUE
 80  C
 81           CALL WSNE(X)
 82  C
 83           WRITE (*,2009)
 84     2009 FORMAT ( ' EQUIPMENT TABLE')
 85           DO 2010 K=1,WSMX
 86           WRITE (*,*) WSN(K),MACH(K), WSMACH(K)
 87     2010 CONTINUE
 88           DO 2020 K=1,MTOT
 89           WRITE (*,*) K,MACHX(K),MSTAT(K)
 90     2020 CONTINUE
 91  C
 92  C
 93           DO 2300 K=1,NUMPR
 94  C
 95           CALL PRINP(PRODES(K), K)
 96  C
 97           WRITE (*,2190) K
 98     2190 FORMAT(' PROCESS NUMBER', I5)
 99           DO 2200 I=1, STPNUM(K)
100           WRITE (*,*) I, PROCES(I,K), SETUP(I,K), PROTIM(I,K), YIELD(I,K)
101     2200 CONTINUE
102     2300 CONTINUE
103           CALL HUBNOK(X)
104           CALL HUBOUT(X)
105           CALL LOTINP(LOTST)
106           WRITE (*,2310)
107     2310 FORMAT (' LOT START INFORMATION')
108           WRITE (*,2313)
109     2313 FORMAT(' PROS INTER   NUM  SIZE')
110           DO 2315 I=1,NUMPR
111           WRITE (*, 2314) I,TINT(I), MSTRT(I), LOTSZ(I)
112     2314 FORMAT(I5,F8.3,2I5)
113     2315 CONTINUE
114           CALL LOTAB (TOT)
115           WRITE (*,2320)
116     2320 FORMAT ( 'LOT STARTS ')
117           WRITE (*,*) TOTL(1),TOTL(2),TOTL(3),TOTL(4),TOTL(5)
118           WRITE (*,2340)
119     2340 FORMAT (' INITIAL LOT ARRAY')
120           DO 2400 I=1,TOT
121           WRITE (*,*) ALNK(I),ST(I),IP(I), IPS(I), WSL(I), AT(I)
122     2400 CONTINUE
123  C
124  C        CALL QINIT(X)
125           TIMEX=0.
126           OCY=1
127           CALL CYCLET(CYCLE,OCY)
128           CALL IMAGE(0.)
129  C
130           CALL DYNAM(DTIME)
131           END
NUMBER OF WARNINGS IN PROGRAM UNIT: 0
NUMBER OF ERRORS   IN PROGRAM UNIT: 0
```

```
132         SUBROUTINE DYNAM(DTIME )
133   C     LOT DYNAMICS DRIVER
134         INTEGER*2 EVENT, EVMOL
135         REAL TIME,DTIME
136         INCLUDE 'COMRAM.FOR'
137         INTEGER*2 WSN(50), MACH(50), BS(50), WSMX, MACHX(1000),WSMACH(50),
138        1          MSTAT(1000), MTOT, PROCES(100,5), STPNUM(5), NUMPR,
139        2          HUBNO(50,5), HUBNOX(50,5), HUBPR(100,5),HUBNOY(50),
140        3          IP(300),IPS(300),WSL(300),IPART(300),MSTRT(5),
141        4          LOTSZ(5),IXLOT,ETYPE(1000),BLNK(1000),MWLOT(1000),
142        5          EHD,ETL,ETLM,ALNK(300),TOTL(5),LHEAD,
143        6          QLOT(300), QPH(100,5), QPT(100,5), QKNT(100,5)
144         REAL FT,RT,SHOR,SETUP, PROTIM, YIELD, ST,AT,TINT,TSTRT,ETIME,
145        1          TIMEX,DT, MAINT, CUM,REST
146         DIMENSION FT(50), RT(50), SETUP(100,5), PROTIM(100,5),
147        1          YIELD(100,5), ST(300), AT(300), ETIME(1000),DT(300),
148        2          TINT(5), MAINT(1000),CUM(100,5),REST(100)
149   C
150         COMMON WSN,MACH,BS,MACHX,MSTAT,WSMACH,WSMX,MTOT,FT,RT
151         COMMON ETYPE,BLNK,MWLOT,EHD,ETL,ETLM,ETIME, MAINT
152         COMMON TIMEX, SHOR, TSTRT, TINT, MSTRT, LOTSZ, TOTL
153         COMMON PROCES,STPNUM,NUMPR,SETUP,PROTIM,YIELD,CUM,REST
154         COMMON HUBNO,HUBNOX,HUBPR,HUBNOY
155         COMMON ALNK,IP,IPS,WSL,IPART,ST,AT,IXLOT,DT,LHEAD
156         COMMON QLOT,QPH,QPT,QKNT
157         TIMEX=TSTRT
158         TIME=TSTRT
159         TLAST=TSTRT+SHOR
160         TLAST=TSTRT+DTIME
161         EVENT=1
162         EVMOL=LHEAD
163         IXLOT=LHEAD
164   10    CONTINUE
165         IF (TIME.GT.TLAST) GOTO 1000
166         TIMEX=TIME
167                 GOTO (100,200,300,400) EVENT
168   100         CALL EVSL1(EVMOL)
169               GOTO 500
170   200         CALL EVMU2(EVMOL)
171               GOTO 500
172   300         CALL EVMD3(EVMOL)
173               GOTO 500
174   400         CALL EVMR4(EVMOL)
175   500       CONTINUE
176             . CALL IMAGE(X)
177             CALL NEXT(EVENT, TIME,EVMOL)
178             GOTO 10
179   1000 CONTINUE
180   C     END OF SIMULATION, COMPUTE FINAL STATISTICS
181         RETURN
182         END
```

NUMBER OF WARNINGS IN PROGRAM UNIT: 0
NUMBER OF ERRORS   IN PROGRAM UNIT: 0

```
183   C
184   C
185         SUBROUTINE NEXT(EVENT,TIME ,EVMOL)
186   C     EVENT      TYPE OF EVENT
187   C     TIME       TIME OF EVENT
188   C     EVMOL      MACHINE OR LOT ID
189         INTEGER*2 EVENT, EVMOL
190         REAL TIME
191         INCLUDE 'COMRAM.FOR'
192         INTEGER*2 WSN(50), MACH(50), BS(50), WSMX, MACHX(1000),WSMACH(50),
```

```
193        1          MSTAT(1000), MTOT, PROCES(100,5), STPNUM(5), NUMPR,
194        2          HUBNO(50,5), HUBNOX(50,5), HUBPR(100,5),HUBNOY(50),
195        3          IP(300),IPS(300),WSL(300),IPART(300),MSTRT(5),
196        4          LOTSZ(5),IXLOT,ETYPE(1000),BLNK(1000),MWLOT(1000),
197        5          EHD,ETL,ETLM,ALNK(300),TOTL(5),LHEAD,
198        6          QLOT(300), QPH(100,5), QPT(100,5), QKNT(100,5)
199       REAL FT,RT,SHOR,SETUP, PROTIM, YIELD, ST,AT,TINT,TSTRT,ETIME,
200        1          TIMEX,DT, MAINT, CUM,REST
201       DIMENSION FT(50), RT(50), SETUP(100,5), PROTIM(100,5),
202        1          YIELD(100,5), ST(300), AT(300), ETIME(1000),DT(300),
203        2          TINT(5), MAINT(1000),CUM(100,5),REST(100)
204 C
205       COMMON WSN,MACH,BS,MACHX,MSTAT,WSMACH,WSMX,MTOT,FT,RT
206       COMMON ETYPE,BLNK,MWLOT,EHD,ETL,ETLM,ETIME, MAINT
207       COMMON TIMEX, SHOR, TSTRT, TINT, MSTRT, LOTSZ, TOTL
208       COMMON PROCES,STPNUM,NUMPR,SETUP,PROTIM,YIELD,CUM,REST
209       COMMON HUBNO,HUBNOX,HUBPR,HUBNOY
210       COMMON ALNK,IP,IPS,WSL,IPART,ST,AT,IXLOT,DT,LHEAD
211       COMMON QLOT,QPH,QPT,QKNT
212 C     SET NEXT EVENT EQUAL TO LOT START
213       EVENT=1
214       TIME=ST(IXLOT)
215       EVMOL=IXLOT
216       IF(EHD.EQ.0) GOTO 1000
217 C     COMPARE TO NEXT MACHINE EVENT
218       IF(TIME.LE.ETIME(ETL)) GOTO 1000
219       TIME=ETIME(ETL)
220       EVENT=ETYPE(ETL)
221       EVMOL=ETL
222       IF (ETH.EQ.ETL) GOTO 900
223       ETL=ETLM
224       BLNK(ETLM)=0
225       GOTO 1000
226  900 CONTINUE
227 C     MACHINE EVENT LIST IS NOW EMPTY
228       ETH=0
229       ETL=0
230       ETLM=0
231 1000 CONTINUE
232       RETURN
233       END
```

NUMBER OF WARNINGS IN PROGRAM UNIT: 0
NUMBER OF ERRORS   IN PROGRAM UNIT: 0

```
234 C
235 C
236       SUBROUTINE SCHED(MSN,IVNT,TIME )
237 C     MSN    MACHINE NUMBER
238 C     IVNT   EVENT TYPE
239 C     TIME   TIME FOR NEXT EVENT
240       INTEGER*2 NEXT,NEXTL
241       INCLUDE 'COMRAM.FOR'
242       INTEGER*2 WSN(50), MACH(50), BS(50), WSMX, MACHX(1000),WSMACH(50),
243        1          MSTAT(1000), MTOT, PROCES(100,5), STPNUM(5), NUMPR,
244        2          HUBNO(50,5), HUBNOX(50,5), HUBPR(100,5),HUBNOY(50),
245        3          IP(300),IPS(300),WSL(300),IPART(300),MSTRT(5),
246        4          LOTSZ(5),IXLOT,ETYPE(1000),BLNK(1000),MWLOT(1000),
247        5          EHD,ETL,ETLM,ALNK(300),TOTL(5),LHEAD,
248        6          QLOT(300), QPH(100,5), QPT(100,5), QKNT(100,5)
249       REAL FT,RT,SHOR,SETUP, PROTIM, YIELD, ST,AT,TINT,TSTRT,ETIME,
250        1          TIMEX,DT, MAINT, CUM,REST
251       DIMENSION FT(50), RT(50), SETUP(100,5), PROTIM(100,5),
252        1          YIELD(100,5), ST(300), AT(300), ETIME(1000),DT(300),
253        2          TINT(5), MAINT(1000),CUM(100,5),REST(100)
254 C
255       COMMON WSN,MACH,BS,MACHX,MSTAT,WSMACH,WSMX,MTOT,FT,RT
256       COMMON ETYPE,BLNK,MWLOT,EHD,ETL,ETLM,ETIME, MAINT
```

```
257           COMMON TIMEX, SHOR, TSTRT, TINT, MSTRT, LOTSZ, TOTL
258           COMMON PROCES,STPNUM,NUMPR,SETUP,PROTIM,YIELD,CUM,REST
259           COMMON HUBNO,HUBNOX,HUBPR,HUBNOY
260           COMMON ALNK,IP,IPS,WSL,IPART,ST,AT,IXLOT,DT,LHEAD
261           COMMON QLOT,QPH,QPT,QKNT
262           IF (EHD.EQ.0) GOTO 800
263           IF (TIME .LE. ETIME(EHD)) GOTO 100
264 C             NEW HEAD
265           BLNK(MSN)=EHD
266           EHD=MSN
267           GOTO 1000
268   100     NEXT=BLNK(EHD)
269           NEXTL=EHD
270   150     IF (NEXT.EQ.0) GOTO 900
271           IF (EHD.EQ.ETL) GOTO 700
272           IF (TIME .LE. ETIME(NEXT)) GOTO 200
273               BLNK(MSN)=NEXT
274               BLNK(NEXTL)=MSN
275           GOTO 1000
276   200     NEXTL=NEXT
277           NEXT=BLNK(NEXT)
278           GOTO 150
279   700 CONTINUE
280 C         SECOND ITEM TO LIST
281           ETL=MSN
282           BLNK(EHD)=MSN
283           BLNK(ETL)=0
284           ETLM=EHD
285           GOTO 1000
286   800 CONTINUE
287 C         EVENT LIST IS EMPTY, ADD TO IT
288           EHD=MSN
289           ETL=MSN
290           BLNK(MSN)=0
291           GOTO 1000
292   900 CONTINUE
293 C         NEW TAIL
294           ETL=MSN
295           BLNK(NEXT)=MSN
296           BLNK(MSN)=0
297           ETLM=NEXT
298  1000 CONTINUE
299 C         EVENT HAS BEEN SCHEDULED
300           RETURN
301           END

NUMBER OF WARNINGS IN PROGRAM UNIT: 0
NUMBER OF ERRORS   IN PROGRAM UNIT: 0

302 C
303 C
304           SUBROUTINE EVSL1(EVMOL)
305 C         LOT START ROUTINE
306           INTEGER*2 EVMOL
307           INCLUDE 'COMRAM.FOR'
308           INTEGER*2 WSN(50), MACH(50), BS(50), WSMX, MACHX(1000),WSMACH(50),
309      1              MSTAT(1000), MTOT, PROCES(100,5), STPNUM(5), NUMPR,
310      2              HUBNO(50,5), HUBNOX(50,5), HUBPR(100,5),HUBNOY(50),
311      3              IP(300),IPS(300),WSL(300),IPART(300),MSTRT(5),
312      4              LOTSZ(5),IXLOT,ETYPE(1000),BLNK(1000),MWLOT(1000),
313      5              EHD,ETL,ETLM,ALNK(300),TOTL(5),LHEAD,
314      6              QLOT(300), QPH(100,5), QPT(100,5), QKNT(100,5)
315           REAL FT,RT,SHOR,SETUP, PROTIM, YIELD, ST,AT,TINT,TSTRT,ETIME,
316      1              TIMEX,DT, MAINT, CUM,REST
317           DIMENSION FT(50), RT(50), SETUP(100,5), PROTIM(100,5),
```

```
318     1          YIELD(100,5), ST(300), AT(300), ETIME(1000),DT(300),
319     2          TINT(5), MAINT(1000),CUM(100,5),REST(100)
320 C
321        COMMON WSN,MACH,BS,MACHX,MSTAT,WSMACH,WSMX,MTOT,FT,RT
322        COMMON ETYPE,BLNK,MWLOT,EHD,ETL,ETLM,ETIME, MAINT
323        COMMON TIMEX, SHOR, TSTRT, TINT, MSTRT, LOTSZ, TOTL
324        COMMON PROCES,STPNUM,NUMPR,SETUP,PROTIM,YIELD,CUM,REST
325        COMMON HUBNO,HUBNOX,HUBPR,HUBNOY
326        COMMON ALNK,IP,IPS,WSL,IPART,ST,AT,IXLOT,DT,LHEAD
327        COMMON QLOT,QPH,QPT,QKNT
328         WRITE (*,100) EVMOL, TIMEX
329  100    FORMAT (' LOT START ',I5,' TIME IS ',F8.3)
330        IXLOT=ALNK(IXLOT)
331        CALL EVLM5(EVMOL)
332        RETURN
333        END
```

NUMBER OF WARNINGS IN PROGRAM UNIT: 0
NUMBER OF ERRORS   IN PROGRAM UNIT: 0

```
334 C
335 C
336        SUBROUTINE EVMU2(EVMOL)
337 C   UNLOAD A MACHINE
338        INTEGER*2 EVMOL, LOTID, LOTLOD
339        INCLUDE 'COMRAM.FOR'
340        INTEGER*2 WSN(50), MACH(50), BS(50), WSMX, MACHX(1000),WSMACH(50),
341     1          MSTAT(1000), MTOT, PROCES(100,5), STPNUM(5), NUMPR,
342     2          HUBNO(50,5), HUBNOX(50,5), HUBPR(100,5),HUBNOY(50),
343     3          IP(300),IPS(300),WSL(300),IPART(300),MSTRT(5),
344     4          LOTSZ(5),IXLOT,ETYPE(1000),BLNK(1000),MWLOT(1000),
345     5          EHD,ETL,ETLM,ALNK(300),TOTL(5),LHEAD,
346     6          QLOT(300), QPH(100,5), QPT(100,5), QKNT(100,5)
347        REAL FT,RT,SHOR,SETUP, PROTIM, YIELD, ST,AT,TINT,TSTRT,ETIME,
348     1          TIMEX,DT, MAINT, CUM,REST
349        DIMENSION FT(50), RT(50), SETUP(100,5), PROTIM(100,5),
350     1          YIELD(100,5), ST(300), AT(300), ETIME(1000),DT(300),
351     2          TINT(5), MAINT(1000),CUM(100,5),REST(100)
352 C
353        COMMON WSN,MACH,BS,MACHX,MSTAT,WSMACH,WSMX,MTOT,FT,RT
354        COMMON ETYPE,BLNK,MWLOT,EHD,ETL,ETLM,ETIME, MAINT
355        COMMON TIMEX, SHOR, TSTRT, TINT, MSTRT, LOTSZ, TOTL
356        COMMON PROCES,STPNUM,NUMPR,SETUP,PROTIM,YIELD,CUM,REST
357        COMMON HUBNO,HUBNOX,HUBPR,HUBNOY
358        COMMON ALNK,IP,IPS,WSL,IPART,ST,AT,IXLOT,DT,LHEAD
359        COMMON QLOT,QPH,QPT,QKNT
360         WRITE(*,100) EVMOL,TIMEX
361  100    FORMAT(' MACHINE UNLOAD ', I5,' TIME IS ',F8.3)
362        MSTAT(EVMOL)=-1
363        LOTID=MWLOT(EVMOL)
364        CALL EVLM5(LOTID)
365        IF (MAINT(EVMOL).LE.TIMEX) GOTO 900
366        CALL QUEUE(WSNE(EVMOL), LOTLOD)
367        IF (LOTLOD.EQ.0) GOTO 1000
368        CALL EVML6(LOTID,LOTLOD)
369        GOTO 1000
370  900 CONTINUE
371 C   MACHINE IS SCHEDULED TO FAIL
372        MAINT(EVMOL)=TIMEX
373        CALL EVMD3(EVMOL)
374  1000 CONTINUE
375        RETURN
376        END
```

NUMBER OF WARNINGS IN PROGRAM UNIT: 0
NUMBER OF ERRORS   IN PROGRAM UNIT: 0

```
377 C
378 C
379       SUBROUTINE EVMD3(MSN)
380 C     MACHINE GOES DOWN
381       INTEGER*2 MSN, WSKK
382       REAL TIME
383       INCLUDE 'COMRAM.FOR'
384       INTEGER*2 WSN(50), MACH(50), BS(50), WSMX, MACHX(1000),WSMACH(50),
385      1          MSTAT(1000), MTOT, PROCES(100,5), STPNUM(5), NUMPR,
386      2          HUBNO(50,5), HUBNOX(50,5), HUBPR(100,5),HUBNOY(50),
387      3          IP(300),IPS(300),WSL(300),IPART(300),MSTRT(5),
388      4          LOTSZ(5),IXLOT,ETYPE(1000),BLNK(1000),MWLOT(1000),
389      5          EHD,ETL,ETLM,ALNK(300),TOTL(5),LHEAD,
390      6          QLOT(300), QPH(100,5), QPT(100,5), QKNT(100,5)
391       REAL FT,RT,SHOR,SETUP, PROTIM, YIELD, ST,AT,TINT,TSTRT,ETIME,
392      1          TIMEX,DT, MAINT, CUM,REST
393       DIMENSION FT(50), RT(50), SETUP(100,5), PROTIM(100,5),
394      1          YIELD(100,5), ST(300), AT(300), ETIME(1000),DT(300),
395      2          TINT(5), MAINT(1000),CUM(100,5),REST(100)
396 C
397       COMMON WSN,MACH,BS,MACHX,MSTAT,WSMACH,WSMX,MTOT,FT,RT
398       COMMON ETYPE,BLNK,MWLOT,EHD,ETL,ETLM,ETIME, MAINT
399       COMMON TIMEX, SHOR, TSTRT, TINT, MSTRT, LOTSZ, TOTL
400       COMMON PROCES,STPNUM,NUMPR,SETUP,PROTIM,YIELD,CUM,REST
401       COMMON HUBNO,HUBNOX,HUBPR,HUBNOY
402       COMMON ALNK,IP,IPS,WSL,IPART,ST,AT,IXLOT,DT,LHEAD
403       COMMON QLOT,QPH,QPT,QKNT
404       WRITE(*,100) MSN,TIMEX
405  100  FORMAT(' MACHINE FAILS ', I5,'TIME IS ',F8.3)
406       MSTAT(MSN)=-2
407       WSKK=WSNE(MSN)
408       TIME=TIMEX+RT(WSKK)
409       ETIME(MSN)=TIME
410       ETYPE(MSN)=3
411       CALL SCHED(MSN,3,TIME)
412       RETURN
413       END

NUMBER OF WARNINGS IN PROGRAM UNIT: 0
NUMBER OF ERRORS   IN PROGRAM UNIT: 0

414 C
415 C
416       SUBROUTINE EVMR4(MSN)
417 C     MACHINE IS REPAIRED
418       INCLUDE 'COMRAM.FOR'
419       INTEGER*2 WSN(50), MACH(50), BS(50), WSMX, MACHX(1000),WSMACH(50)
420      1          MSTAT(1000), MTOT, PROCES(100,5), STPNUM(5), NUMPR,
421      2          HUBNO(50,5), HUBNOX(50,5), HUBPR(100,5),HUBNOY(50),
422      3          IP(300),IPS(300),WSL(300),IPART(300),MSTRT(5),
423      4          LOTSZ(5),IXLOT,ETYPE(1000),BLNK(1000),MWLOT(1000),
424      5          EHD,ETL,ETLM,ALNK(300),TOTL(5),LHEAD,
425      6          QLOT(300), QPH(100,5), QPT(100,5), QKNT(100,5)
426       REAL FT,RT,SHOR,SETUP, PROTIM, YIELD, ST,AT,TINT,TSTRT,ETIME,
427      1          TIMEX,DT, MAINT, CUM,REST
428       DIMENSION FT(50), RT(50), SETUP(100,5), PROTIM(100,5),
429      1          YIELD(100,5), ST(300), AT(300), ETIME(1000),DT(300),
430      2          TINT(5), MAINT(1000),CUM(100,5),REST(100)
431 C
432       COMMON WSN,MACH,BS,MACHX,MSTAT,WSMACH,WSMX,MTOT,FT,RT
433       COMMON ETYPE,BLNK,MWLOT,EHD,ETL,ETLM,ETIME, MAINT
434       COMMON TIMEX, SHOR, TSTRT, TINT, MSTRT, LOTSZ, TOTL
435       COMMON PROCES,STPNUM,NUMPR,SETUP,PROTIM,YIELD,CUM,REST
436       COMMON HUBNO,HUBNOX,HUBPR,HUBNOY
437       COMMON ALNK,IP,IPS,WSL,IPART,ST,AT,IXLOT,DT,LHEAD
```

```
438          COMMON QLOT,QPH,QPT,QKNT
439          WRITE(*,100) MSN,TIMEX
440  100     FORMAT(' MACHINE IS REPAIRED',I5,' TIME IS',F8.3)
441          MSTAT(MSN)=-1
442          CALL QUEUE(WSNE(MSN),LOTLOD)
443          IF (LOTLOD.EQ.0) GOTO 1000
444          CALL EVML6(LOTLOD,MSN)
445  1000    CONTINUE
446          RETURN
447          END
```

NUMBER OF WARNINGS IN PROGRAM UNIT: 0
NUMBER OF ERRORS   IN PROGRAM UNIT: 0

```
448  C
449  C
450          SUBROUTINE EVLM5(LOTID)
451          INTEGER*2 LOTID,PROD,INDEX,INDEXB,INDEXC,INDEXD,INDEXE,MCK
452          INCLUDE 'COMRAM.FOR'
453          INTEGER*2 WSN(50), MACH(50), BS(50), WSMX, MACHX(1000),WSMACH(50),
454       1          MSTAT(1000), MTOT, PROCES(100,5), STPNUM(5), NUMPR,
455       2          HUBNO(50,5), HUBNOX(50,5), HUBPR(100,5),HUBNOY(50),
456       3          IP(300),IPS(300),WSL(300),IPART(300),MSTRT(5),
457       4          LOTSZ(5),IXLOT,ETYPE(1000),BLNK(1000),MWLOT(1000),
458       5          EHD,ETL,ETLM,ALNK(300),TOTL(5),LHEAD,
459       6          QLOT(300), QPH(100,5), QPT(100,5), QKNT(100,5)
460          REAL FT,RT,SHOR,SETUP, PROTIM, YIELD, ST,AT,TINT,TSTRT,ETIME,
461       1          TIMEX,DT, MAINT, CUM,REST
462          DIMENSION FT(50), RT(50), SETUP(100,5), PROTIM(100,5),
463       1          YIELD(100,5), ST(300), AT(300), ETIME(1000),DT(300),
464       2          TINT(5), MAINT(1000),CUM(100,5),REST(100)
465  C
466          COMMON WSN,MACH,BS,MACHX,MSTAT,WSMACH,WSMX,MTOT,FT,RT
467          COMMON ETYPE,BLNK,MWLOT,EHD,ETL,ETLM,ETIME, MAINT
468          COMMON TIMEX, SHOR, TSTRT, TINT, MSTRT, LOTSZ, TOTL
469          COMMON PROCES,STPNUM,NUMPR,SETUP,PROTIM,YIELD,CUM,REST
470          COMMON HUBNO,HUBNOX,HUBPR,HUBNOY
471          COMMON ALNK,IP,IPS,WSL,IPART,ST,AT,IXLOT,DT,LHEAD
472          COMMON QLOT,QPH,QPT,QKNT
473  C
474          WRITE (*,100) LOTID,TIMEX
475  100     FORMAT(' LOT MOVE', I5,' TIME IS',F8.3)
476  C       LOTID IS THE LOCATION IN THE LOT LIST
477  C       QLOT IS THE LINK LIST FOR LOTS
478  C       QPH  IS THE ARRAY OF HEADS FOR PROCESS STEP QUEUES
479  C       QPT  IS THE ARRAY OF TAILS FOR PROCESS STEP QUEUES
480  C       QKNT IS THE ARRAY OF QUEUE SIZE IN LOTS,STEP I,PROCESS J
481          PROD=IP(LOTID)
482          INDEXB=IPS(LOTID)
483          IPS(LOTID)=IPS(LOTID)+1
484          INDEX=IPS(LOTID)
485          IPART(LOTID)=LOTSZ(PROD)*CUM(INDEX,PROD)
486  C
487  C       INCREMENT QUEUE
488          QKNT(INDEX,PROD)=QKNT(INDEX,PROD)+1
489          IF (QKNT(INDEX,PROD).EQ.1) THEN
490              QPH(INDEX,PROD)=LOTID
491              QPT(INDEX,PROD)=LOTID
492          ELSE IF (INDEXB.EQ.0) THEN
493              QLOT(LOTID)=QPH(INDEX,PROD)
494              QPH(INDEX,PROD)=LOTID
495          ELSE
```

```
496 C       MOVE A LOT TO NEXT QUEUE
497             INDEXD=QPH(INDEXB,PROD)
498             INDEXE=QLOT(INDEXD)
499 C       CHANGE TAIL OF NEW QUEUE
500             INDEXC=QPT(INDEX,PROD)
501             QLOT(INDEXC)=LOTID
502             QPT(INDEX,PROD)=QPH(INDEXB,PROD)
503             QLOT(LOTID)=0
504 C       CHANGE HEAD OF OLD QUEUE
505             QPH(INDEXB,PROD)=INDEXE
506             QKNT(INDEXB,PROD)=QKNT(INDEXB,PROD)-1
507         END IF
508 C       ASSIGN LOT TO WORKSTATION
509         WSL(LOTID)=PROCES(INDEX,PROD)
510 C       DETERMINE IF MACHINE IS AVAILABLE
511         CALL WORK(WSL(LOTID),MCK)
512         IF (MCK.EQ.0) GOTO 1000
513         CALL EVML6(LOTID,MCK)
514 C       MAKE STATISTICAL CALCULATIONS
515  1000  CONTINUE
516         RETURN
517         END
```

NUMBER OF WARNINGS IN PROGRAM UNIT: 0
NUMBER OF ERRORS   IN PROGRAM UNIT: 0.

```
518 C
519 C
520         SUBROUTINE EVML6(LOTID,MSN)
521 C       LOAD A MACHINE
522 C       MSN      MACHINE NUMBER
523 C       LOTID    LOT ID
524         INTEGER*2 LOTID,MSN,PSTEP,PROD
525         INCLUDE 'COMRAM.FOR'
526         INTEGER*2 WSN(50), MACH(50), BS(50), WSMX, MACHX(1000),WSMACH(50),
527      1            MSTAT(1000), MTOT, PROCES(100,5), STPNUM(5), NUMPR,
528      2            HUBNO(50,5), HUBNOX(50,5), HUBPR(100,5),HUBNOY(50),
529      3            IP(300),IPS(300),WSL(300),IPART(300),MSTRT(5),
530      4            LOTSZ(5), IXLOT,ETYPE(1000),BLNK(1000),MWLOT(1000),
531      5            EHD,ETL,ETLM,ALNK(300),TOTL(5),LHEAD,
532      6            QLOT(300), QPH(100,5), QPT(100,5), QKNT(100,5)
533         REAL FT,RT,SHOR,SETUP, PROTIM, YIELD, ST,AT,TINT,TSTRT,ETIME,
534      1            TIMEX,DT, MAINT, CUM,REST
535         DIMENSION FT(50), RT(50), SETUP(100,5), PROTIM(100,5),
536      1            YIELD(100,5), ST(300), AT(300), ETIME(1000),DT(300),
537      2            TINT(5), MAINT(1000),CUM(100,5),REST(100)
538 C
539         COMMON WSN,MACH,BS,MACHX,MSTAT,WSMACH,WSMX,MTOT,FT,RT
540         COMMON ETYPE,BLNK,MWLOT,EHD,ETL,ETLM,ETIME, MAINT
541         COMMON TIMEX, SHOR, TSTRT, TINT, MSTRT, LOTSZ, TOTL
542         COMMON PROCES,STPNUM,NUMPR,SETUP,PROTIM,YIELD,CUM,REST
543         COMMON HUBNO,HUBNOX,HUBPR,HUBNOY
544         COMMON ALNK,IP,IPS,WSL,IPART,ST,AT,IXLOT,DT,LHEAD
545         COMMON QLOT,QPH,QPT,QKNT
546         WRITE (*,100) LOTID,MSN,TIMEX
547  100    FORMAT(' MACHINE LOAD, LOT',I5,' MACHINE',I5, ' TIME',F8.3)
548         MSTAT(MSN)=0
549         MWLOT(MSN)=LOTID
550         PROD =IP(LOTID)
551         PSTEP =IPS(LOTID)
552         ETIME(MSN)=TIMEX+ PROTIM(PSTEP,PROD)
553         ETYPE(MSN)=2
554         CALL SCHED (MSN,2,ETIME(MSN))
555 C       CALCULATE STATISTICS
556         RETURN
557         END
```

```
558 C
559 C
560       SUBROUTINE EVLC7(LOTN)
561 C     COMPLETE A LOT
562       INCLUDE 'COMRAM.FOR'
563       INTEGER*2 WSN(50), MACH(50), BS(50), WSMX, MACHX(1000),WSMACH(50),
564      1          MSTAT(1000), MTOT, PROCES(100,5), STPNUM(5), NUMPR,
565      2          HUBNO(50,5), HUBNOX(50,5), HUBPR(100,5),HUBNOY(50),
566      3          IP(300),IPS(300),WSL(300),IPART(300),MSTRT(5),
567      4          LOTSZ(5),IXLOT,ETYPE(1000),BLNK(1000),MWLOT(1000),
568      5          EHD,ETL,ETLM,ALNK(300),TOTL(5),LHEAD,
569      6          QLOT(300), QPH(100,5), QPT(100,5), QKNT(100,5)
570       REAL FT,RT,SHOR,SETUP, PROTIM, YIELD, ST,AT,TINT,TSTRT,ETIME,
571      1      TIMEX,DT, MAINT, CUM,REST
572       DIMENSION FT(50), RT(50), SETUP(100,5), PROTIM(100,5),
573      1          YIELD(100,5), ST(300), AT(300), ETIME(1000),DT(300),
574      2          TINT(5), MAINT(1000),CUM(100,5),REST(100)
575 C
576       COMMON WSN,MACH,BS,MACHX,MSTAT,WSMACH,WSMX,MTOT,FT,RT
577       COMMON ETYPE,BLNK,MWLOT,EHD,ETL,ETLM,ETIME, MAINT
578       COMMON TIMEX, SHOR, TSTRT, TINT, MSTRT, LOTSZ, TOTL
579       COMMON PROCES,STPNUM,NUMPR,SETUP,PROTIM,YIELD,CUM,REST
580       COMMON HUBNO,HUBNOX,HUBPR,HUBNOY
581       COMMON ALNK,IP,IPS,WSL,IPART,ST,AT,IXLOT,DT,LHEAD
582       COMMON QLOT,QPH,QPT,QKNT
583
584       RETURN
585       END

NUMBER OF WARNINGS IN PROGRAM UNIT: 0
NUMBER OF ERRORS   IN PROGRAM UNIT: 0

586 C
587 C
588       SUBROUTINE QUEUE(WS,LOT)
589 C     EVALUATES INVENTORY AT WORK STATION
590 C     WS     NUMBER OF WORKSTATION
591 C     LOT    ID OF LOT SELECTED FROM QUEUE
592 C     BASED UPON DISPATCH SCHEME: PROCESS, LATEST STEPS FIRST, FIFO
593       INTEGER*2 WS,LOT,I,J,START,END,STEP,PROD,HEAD
594       INCLUDE 'COMRAM.FOR'
595       INTEGER*2 WSN(50), MACH(50), BS(50), WSMX, MACHX(1000),WSMACH(50),
596      1          MSTAT(1000), MTOT, PROCES(100,5), STPNUM(5), NUMPR,
597      2          HUBNO(50,5), HUBNOX(50,5), HUBPR(100,5),HUBNOY(50),
598      3          IP(300),IPS(300),WSL(300),IPART(300),MSTRT(5),
599      4          LOTSZ(5),IXLOT,ETYPE(1000),BLNK(1000),MWLOT(1000),
600      5          EHD,ETL,ETLM,ALNK(300),TOTL(5),LHEAD,
601      6          QLOT(300), QPH(100,5), QPT(100,5), QKNT(100,5)
602       REAL FT,RT,SHOR,SETUP, PROTIM, YIELD, ST,AT,TINT,TSTRT,ETIME,
603      1      TIMEX,DT, MAINT, CUM,REST
604       DIMENSION FT(50), RT(50), SETUP(100,5), PROTIM(100,5),
605      1          YIELD(100,5), ST(300), AT(300), ETIME(1000),DT(300),
606      2          TINT(5), MAINT(1000),CUM(100,5),REST(100)
607 C
608       COMMON WSN,MACH,BS,MACHX,MSTAT,WSMACH,WSMX,MTOT,FT,RT
609       COMMON ETYPE,BLNK,MWLOT,EHD,ETL,ETLM,ETIME, MAINT
610       COMMON TIMEX, SHOR, TSTRT, TINT, MSTRT, LOTSZ, TOTL
611       COMMON PROCES,STPNUM,NUMPR,SETUP,PROTIM,YIELD,CUM,REST
612       COMMON HUBNO,HUBNOX,HUBPR,HUBNOY
613       COMMON ALNK,IP,IPS,WSL,IPART,ST,AT,IXLOT,DT,LHEAD
614       COMMON QLOT,QPH,QPT,QKNT
615       DO 500 J=1,NUMPR
616         START=HUBNOX(WS,J)
617         END=HUBNOX(WS,J)+HUBNO(WS,J)-1
618         DO 400 I=END,START,-1
619           PROD=J
620           STEP=HUBPR(I,J)
621           IF (QKNT(STEP,PROD).EQ.0) GOTO 400
622           GOTO 800
```

```
623    400     CONTINUE
624    500 CONTINUE
625 C      THERE ARE NO LOTS IN THE QUEUES
626        LOT=0
627        GOTO 1000
628    800 CONTINUE
629 C      BASED UPON DISPATCH SCHEME, THE FIRST QUEUE WITH LOTS
630        HEAD=QPH(STEP,PROD)
631        LOT=QLOT(HEAD)
632   1000 CONTINUE
633        RETURN
634        END
```

NUMBER OF WARNINGS IN PROGRAM UNIT: 0
NUMBER OF ERRORS   IN PROGRAM UNIT: 0

```
635 C
636 C
637        SUBROUTINE WORK(WNUM,WVAL)
638 C      CHECK IF MACHINE IS AVAILABLE
639        INTEGER*2 WNUM,WVAL,START,END
640 C      WNUM    NUMBER OF WORK STATION
641 C      WVAL    IS NUMBER OF FIRST EMPTY MACHINE, ZERO IF NONE
642        INCLUDE 'COMRAM.FOR'
643        INTEGER*2 WSN(50), MACH(50), BS(50), WSMX, MACHX(1000),WSMACH(50),
644       1          MSTAT(1000), MTOT, PROCES(100,5), STPNUM(5), NUMPR,
645       2          HUBNO(50,5), HUBNOX(50,5), HUBPR(100,5),HUBNOY(50),
646       3          IP(300),IPS(300),WSL(300),IPART(300),MSTRT(5),
647       4          LOTSZ(5),IXLOT,ETYPE(1000),BLNK(1000),MWLOT(1000),
648       5          EHD,ETL,ETLM,ALNK(300),TOTL(5),LHEAD,
649       6          QLOT(300), QPH(100,5), QPT(100,5), QKNT(100,5)
650        REAL FT,RT,SHOR,SETUP, PROTIM, YIELD, ST,AT,TINT,TSTRT,ETIME,
651       1     TIMEX,DT, MAINT, CUM,REST
652        DIMENSION FT(50), RT(50), SETUP(100,5), PROTIM(100,5),
653       1          YIELD(100,5), ST(300), AT(300), ETIME(1000),DT(300),
654       2          TINT(5), MAINT(1000),CUM(100,5),REST(100)
655 C
656        COMMON WSN,MACH,BS,MACHX,MSTAT,WSMACH,WSMX,MTOT,FT,RT
657        COMMON ETYPE,BLNK,MWLOT,EHD,ETL,ETLM,ETIME, MAINT
658        COMMON TIMEX, SHOR, TSTRT, TINT, MSTRT, LOTSZ, TOTL
659        COMMON PROCES,STPNUM,NUMPR,SETUP,PROTIM,YIELD,CUM,REST
660        COMMON HUBNO,HUBNOX,HUBPR,HUBNOY
661        COMMON ALNK,IP,IPS,WSL,IPART,ST,AT,IXLOT,DT,LHEAD
662        COMMON QLOT,QPH,QPT,QKNT
663        WVAL=0
664        START=WSMACH(WNUM)
665        END=START+MACH(WNUM)-1
666    100 IF(MSTAT(START).EQ. -1) GOTO 900
667        IF (START.EQ.END) GOTO 1000
668        START=START+1
669        GOTO 100
670    900 CONTINUE
671        WVAL=START
672   1000 CONTINUE
673        RETURN
674        END
```

NUMBER OF WARNINGS IN PROGRAM UNIT: 0
NUMBER OF ERRORS   IN PROGRAM UNIT: 0

```
675
```

NUMBER OF WARNINGS IN COMPILATION : 0
NUMBER OF ERRORS   IN COMPILATION : 0

RM/FORTRAN Compiler (V2.00A)
Source File: FABPAT.FOR                 Options: /l/p 60

```
  1            PROGRAM FABSIM
  2  C         THIS PROGRAM MODELS WAFER-LOT MOVEMENT AND
  3  C         MACHINE INTERACTIONS, PROVIDES DETAILED
  4  C         BEHAVIOR INCLUDING MACHINE SCHEDULES
  5  C
  6  C         REV. 1.0        18 AUGUST 1986
  7  C         MAIN PROGRAM
  8  C         WAFER FABRICATION DYNAMICS SIMULATION
  9  C
 10            REAL DTIME
 11            INTEGER*2 OCY,TOT
 12            CHARACTER*12 PRBDES, LOTST, FABDES, PRODES(5)
 13            INCLUDE 'COMRAM.FOR'
 14            INTEGER*2 WSN(50), MACH(50), BS(50), WSMX, MACHX(1000),WSMACH(50),
 15       1              MSTAT(1000), MTOT, PROCES(100,5), STPNUM(5), NUMPR,
 16       2              HUBNO(50,5), HUBNOX(50,5), HUBPR(100,5),HUBNOY(50),
 17       3              IP(300),IPS(300),WSL(300),IPART(300),MSTRT(5),
 18       4              LOTSZ(5),IXLOT,ETYPE(1000),BLNK(1000),MWLOT(1000),
 19       5              EHD,ETL,ETLM,ALNK(300),TOTL(5),LHEAD,
 20       6              QLOT(300), QPH(100,5), QPT(100,5), QKNT(100,5)
 21            REAL FT,RT,SHOR,SETUP, PROTIM, YIELD, ST,AT,TINT,TSTRT,ETIME,
 22       1         TIMEX,DT, MAINT, CUM,REST
 23            DIMENSION FT(50), RT(50), SETUP(100,5), PROTIM(100,5),
 24       1              YIELD(100,5), ST(300), AT(300), ETIME(1000),DT(300),
 25       2              TINT(5), MAINT(1000),CUM(100,5),REST(100)
 26  C
 27            COMMON WSN,MACH,BS,MACHX,MSTAT,WSMACH,WSMX,MTOT,FT,RT
 28            COMMON ETYPE,BLNK,MWLOT,EHD,ETL,ETLM,ETIME, MAINT
 29            COMMON TIMEX, SHOR, TSTRT, TINT, MSTRT, LOTSZ, TOTL
 30            COMMON PROCES,STPNUM,NUMPR,SETUP,PROTIM,YIELD,CUM,REST
 31            COMMON HUBNO,HUBNOX,HUBPR,HUBNOY
 32            COMMON ALNK,IP,IPS,WSL,IPART,ST,AT,IXLOT,DT,LHEAD
 33            COMMON QLOT,QPH,QPT,QKNT
 34            WRITE (*,100)
 35            WRITE (*,110)
 36            WRITE (*,120)
 37            WRITE (*,130)
 38       100 FORMAT (' WAFER FABRICATION DYNAMICS SIMULATION SYSTEM')
 39       110 FORMAT (' COPYRIGHT, IN-MOTION TECHNOLOGY, 1986')
 40       120 FORMAT (' ******************************')
 41       130 FORMAT ('                                ')
 42  C
 43  C         PROGRAM USES NESTED INPUT FILES
 44  C         REQUESTS NAME OF PROBLEM DESCRIPTION FILE
 45            WRITE (*,1000)
 46      1000 FORMAT (' NAME OF PROBLEM DESCRIPTION FILE')
 47            READ (*,*) PRBDES
 48            WRITE (*,1010)
 49            WRITE (*,*) PRBDES
 50      1010 FORMAT (' NAME OF PROBLEM DESCRIPTION FILE' )
 51  C
 52            READ (*,*) DTIME
 53            WRITE (*,*) DTIME
 54  C
 55            NU=1
 56            OPEN (NU,FILE=PRBDES)
 57            READ (NU,*) FABDES
 58            WRITE (*,1040)
 59            WRITE (*,*) FABDES
 60  C
 61            READ (NU,*) NUMPR
 62            WRITE (*,*) NUMPR
 63            WRITE (*,1040)
 64            DO 1020 K=1,NUMPR
 65                READ (NU,*) PRODES(K)
 66                WRITE (*,*) PRODES(K)
```

```
 67  1020 CONTINUE
 68.      READ  (NU,*) LOTST
 69       WRITE (*,*) LOTST
 70       READ (NU, 1030) SHOR,TSTRT
 71       WRITE (*,*) SHOR,TSTRT
 72  1030 FORMAT(2F8.2)
 73       CLOSE (NU)
 74  1040 FORMAT (' NAME OF FAB DESCRIPTION FILE')
 75 C
 76       CALL WKINP(FABDES)
 77       DO 2000 I=1,WSMX
 78       WRITE (*,*) WSN(I), MACH(I), BS(I), FT(I), RT(I)
 79  2000 CONTINUE
 80 C
 81       CALL WSNE(X)
 82 C
 83       WRITE (*,2009)
 84  2009 FORMAT ( ' EQUIPMENT TABLE')
 85       DO 2010 K=1,WSMX
 86       WRITE (*,*) WSN(K),MACH(K), WSMACH(K)
 87  2010 CONTINUE
 88       DO 2020 K=1,MTOT
 89       WRITE (*,*) K,MACHX(K),MSTAT(K)
 90  2020 CONTINUE
 91 C
 92 C
 93       DO 2300 K=1,NUMPR
 94 C
 95       CALL PRINP(PRODES(K), K)
 96 C
 97       WRITE (*,2190) K
 98  2190 FORMAT(' PROCESS NUMBER', I5)
 99       DO 2200 I=1, STPNUM(K)
100       WRITE (*,*) I, PROCES(I,K), SETUP(I,K), PROTIM(I,K), YIELD(I,K)
101  2200 CONTINUE
102  2300 CONTINUE
103       CALL HUBNOK(X)
104       CALL HUBOUT(X)
105       CALL LOTINP(LOTST)
106       WRITE (*,2310)
107  2310 FORMAT (' LOT START INFORMATION')
108       WRITE (*,2313)
109  2313 FORMAT(' PROS INTER   NUM  SIZE')
110       DO 2315 I=1,NUMPR
111       WRITE (*, 2314) I,TINT(I), MSTRT(I), LOTSZ(I)
112  2314 FORMAT(I5,F8.3,2I5)
113  2315 CONTINUE
114       CALL LOTAB (TOT)
115       WRITE (*,2320)
116  2320 FORMAT ( 'LOT STARTS ')
117       WRITE (*,*) TOTL(1),TOTL(2),TOTL(3),TOTL(4),TOTL(5)
118       WRITE (*,2340)
119  2340 FORMAT (' INITIAL LOT ARRAY')
120       DO 2400 I=1,TOT
121       WRITE (*,*) ALNK(I),ST(I),IP(I), IPS(I), WSL(I), AT(I)
122  2400 CONTINUE
123 C
124 C     CALL QINIT(X)
125       TIMEX=0.
126       OCY=1
127       CALL CYCLET(CYCLE,OCY)
128       CALL IMAGE(0.)
129 C
130       CALL DYNAM(DTIME)
131       END

NUMBER OF WARNINGS IN PROGRAM UNIT: 0
NUMBER OF ERRORS   IN PROGRAM UNIT: 0
```

```
132        SUBROUTINE DYNAM(DTIME )
133 C      LOT DYNAMICS DRIVER .
134        INTEGER*2 EVENT, EVMOL
135        REAL TIME,DTIME
136        INCLUDE 'COMRAM.FOR'
137        INTEGER*2 WSN(50), MACH(50), BS(50), WSMX, MACHX(1000),WSMACH(50),
138       1          MSTAT(1000), MTOT, PROCES(100,5), STPNUM(5), NUMPR,
139       2          HUBNO(50,5), HUBNOX(50,5), HUBPR(100,5),HUBNOY(50),
140       3          IP(300),IPS(300),WSL(300),IPART(300),MSTRT(5),
141       4          LOTSZ(5),IXLOT,ETYPE(1000),BLNK(1000),MWLOT(1000),
142       5          EHD,ETL,ETLM,ALNK(300),TOTL(5),LHEAD,
143       6          QLOT(300), QPH(100,5), QPT(100,5), QKNT(100,5)
144        REAL FT,RT,SHOR,SETUP, PROTIM, YIELD, ST,AT,TINT,TSTRT,ETIME,
145       1          TIMEX,DT, MAINT, CUM,REST
146        DIMENSION FT(50), RT(50), SETUP(100,5), PROTIM(100,5),
147       1          YIELD(100,5), ST(300), AT(300), ETIME(1000),DT(300),
148       2          TINT(5), MAINT(1000),CUM(100,5),REST(100)
149 C
150        COMMON WSN,MACH,BS,MACHX,MSTAT,WSMACH,WSMX,MTOT,FT,RT
151        COMMON ETYPE,BLNK,MWLOT,EHD,ETL,ETLM,ETIME, MAINT
152        COMMON TIMEX, SHOR, TSTRT, TINT, MSTRT, LOTSZ, TOTL
153        COMMON PROCES,STPNUM,NUMPR,SETUP,PROTIM,YIELD,CUM,REST
154        COMMON HUBNO,HUBNOX,HUBPR,HUBNOY
155        COMMON ALNK,IP,IPS,WSL,IPART,ST,AT,IXLOT,DT,LHEAD
156        COMMON QLOT,QPH,QPT,QKNT
157        TIMEX=TSTRT
158        TIME=TSTRT
159        TLAST=TSTRT+SHOR
160        TLAST=TSTRT+DTIME
161        EVENT=1
162        EVMOL=LHEAD
163        IXLOT=LHEAD
164  10    CONTINUE
165        IF (TIME.GT.TLAST) GOTO 1000
166        TIMEX=TIME
167               GOTO (100,200,300,400) EVENT
168  100           CALL EVSL1(EVMOL)
169               GOTO 500
170  200           CALL EVMU2(EVMOL)
171               GOTO 500
172  300           CALL EVMD3(EVMOL)
173               GOTO 500
174  400           CALL EVMR4(EVMOL)
175  500        CONTINUE
176               CALL IMAGE(X)
177            CALL NEXT(EVENT, TIME,EVMOL)
178            GOTO 10
179  1000 CONTINUE
180        RETURN
181        END
```

NUMBER OF WARNINGS IN PROGRAM UNIT: 0
NUMBER OF ERRORS   IN PROGRAM UNIT: 0

```
182 C
183 C
184        SUBROUTINE NEXT(EVENT,TIME ,EVMOL)
185 C      EVENT      TYPE OF EVENT
186 C      TIME       TIME OF EVENT
187 C      EVMOL      MACHINE OR LOT ID
188        INTEGER*2 EVENT, EVMOL
189        REAL TIME
190        INCLUDE 'COMRAM.FOR'
191        INTEGER*2 WSN(50), MACH(50), BS(50), WSMX, MACHX(1000),WSMACH(50),
```

```
192     1              MSTAT(1000), MTOT, PROCES(100,5), STPNUM(5), NUMPR,
193     2              HUBNO(50,5), HUBNOX(50,5), HUBPR(100,5),HUBNOY(50),
194     3              IP(300),IPS(300),WSL(300),IPART(300),MSTRT(5),
195     4              LOTSZ(5),IXLOT,ETYPE(1000),BLNK(1000),MWLOT(1000),
196     5              EHD,ETL,ETLM,ALNK(300),TOTL(5),LHEAD,
197     6              QLOT(300), QPH(100,5), QPT(100,5), QKNT(100,5)
198        REAL FT,RT,SHOR,SETUP, PROTIM, YIELD, ST,AT,TINT,TSTRT,ETIME,
199     1       TIMEX,DT, MAINT, CUM,REST
200        DIMENSION FT(50), RT(50), SETUP(100,5), PROTIM(100,5),
201     1            YIELD(100,5), ST(300), AT(300), ETIME(1000),DT(300),
202     2            TINT(5), MAINT(1000),CUM(100,5),REST(100)
203  C
204        COMMON WSN,MACH,BS,MACHX,MSTAT,WSMACH,WSMX,MTOT,FT,RT
205        COMMON ETYPE,BLNK,MWLOT,EHD,ETL,ETLM,ETIME, MAINT
206        COMMON TIMEX, SHOR, TSTRT, TINT, MSTRT, LOTSZ, TOTL
207        COMMON PROCES,STPNUM,NUMPR,SETUP,PROTIM,YIELD,CUM,REST
208        COMMON HUBNO,HUBNOX,HUBPR,HUBNOY
209        COMMON ALNK,IP,IPS,WSL,IPART,ST,AT,IXLOT,DT,LHEAD
210        COMMON QLOT,QPH,QPT,QKNT
211  C     SET NEXT EVENT EQUAL TO LOT START
212        EVENT=1
213        TIME=ST(IXLOT)
214        EVMOL=IXLOT
215        IF(EHD.EQ.0) GOTO 1000
216  C     COMPARE TO NEXT MACHINE EVENT
217        IF(TIME.LE.ETIME(ETL)) GOTO 1000
218        TIME=ETIME(ETL)
219        EVENT=ETYPE(ETL)
220        EVMOL=ETL
221        IF (ETH.EQ.ETL) GOTO 900
222        ETL=ETLM
223        BLNK(ETLM)=0
224        GOTO 1000
225  900  CONTINUE
226  C    MACHINE EVENT LIST IS NOW EMPTY
227        ETH=0
228        ETL=0
229        ETLM=0
230  1000 CONTINUE
231        RETURN
232        END
```

NUMBER OF WARNINGS IN PROGRAM UNIT: 0
NUMBER OF ERRORS   IN PROGRAM UNIT: 0

```
233  C
234  C
235        SUBROUTINE SCHED(MSN,IVNT,TIME )
236  C    MSN    MACHINE NUMBER
237  C    IVNT   EVENT TYPE
238  C    TIME   TIME FOR NEXT EVENT
239        INTEGER*2 NEXT,NEXTL
240        INCLUDE 'COMRAM.FOR'
241        INTEGER*2 WSN(50), MACH(50), BS(50), WSMX, MACHX(1000),WSMACH(50),
242     1              MSTAT(1000), MTOT, PROCES(100,5), STPNUM(5), NUMPR,
243     2              HUBNO(50,5), HUBNOX(50,5), HUBPR(100,5),HUBNOY(50),
244     3              IP(300),IPS(300),WSL(300),IPART(300),MSTRT(5),
245     4              LOTSZ(5),IXLOT,ETYPE(1000),BLNK(1000),MWLOT(1000),
246     5              EHD,ETL,ETLM,ALNK(300),TOTL(5),LHEAD,
247     6              QLOT(300), QPH(100,5), QPT(100,5), QKNT(100,5)
248        REAL FT,RT,SHOR,SETUP, PROTIM, YIELD, ST,AT,TINT,TSTRT,ETIME,
249     1       TIMEX,DT, MAINT, CUM,REST
250        DIMENSION FT(50), RT(50), SETUP(100,5), PROTIM(100,5),
251     1            YIELD(100,5), ST(300), AT(300), ETIME(1000),DT(300),
252     2            TINT(5), MAINT(1000),CUM(100,5),REST(100)
253  C
```

```
254        COMMON WSN,MACH,BS,MACHX,MSTAT,WSMACH,WSMX,MTOT,FT,RT
255        COMMON ETYPE,BLNK,MWLOT,EHD,ETL,ETLM,ETIME, MAINT
256        COMMON TIMEX, SHOR, TSTRT, TINT, MSTRT, LOTSZ, TOTL
257        COMMON PROCES,STPNUM,NUMPR,SETUP,PROTIM,YIELD,CUM,REST
258        COMMON HUBNO,HUBNOX,HUBPR,HUBNOY
259        COMMON ALNK,IP,IPS,WSL,IPART,ST,AT,IXLOT,DT,LHEAD
260        COMMON QLOT,QPH,QPT,QKNT
261        IF (EHD.EQ.0) GOTO 800
262        IF (TIME .LE. ETIME(EHD)) GOTO 100
263  C        NEW HEAD
264            BLNK(MSN)=EHD
265            EHD=MSN
266            GOTO 1000
267     100    NEXT=BLNK(EHD)
268            NEXTL=EHD
269     150    IF (NEXT.EQ.0) GOTO 900
270            IF (EHD.EQ.ETL) GOTO 700
271            IF (TIME .LE. ETIME(NEXT)) GOTO 200
272            BLNK(MSN)=NEXT
273            BLNK(NEXTL)=MSN
274            GOTO 1000
275     200    NEXTL=NEXT
276            NEXT=BLNK(NEXT)
277            GOTO 150
278     700 CONTINUE
279  C        SECOND ITEM TO LIST
280            ETL=MSN
281            BLNK(EHD)=MSN
282            BLNK(ETL)=0
283            ETLM=EHD
284            GOTO 1000
285     800 CONTINUE
286  C        EVENT LIST IS EMPTY, ADD TO IT
287            EHD=MSN
288            ETL=MSN
289            BLNK(MSN)=0
290            GOTO 1000
291     900 CONTINUE
292  C        NEW TAIL
293            ETL=MSN
294            BLNK(NEXT)=MSN
295            BLNK(MSN)=0
296            ETLM=NEXT
297    1000 CONTINUE
298  C        EVENT HAS BEEN SCHEDULED
299            RETURN
300            END

NUMBER OF WARNINGS IN PROGRAM UNIT: 0
NUMBER OF ERRORS   IN PROGRAM UNIT: 0

301  C
302  C
303        SUBROUTINE EVSL1(EVMOL)
304  C     LOT START ROUTINE
305        INTEGER*2 EVMOL
306        INCLUDE 'COMRAM.FOR'
307        INTEGER*2 WSN(50), MACH(50), BS(50), WSMX, MACHX(1000),WSMACH(50)
308       1           MSTAT(1000), MTOT, PROCES(100,5), STPNUM(5), NUMPR,
309       2           HUBNO(50,5), HUBNOX(50,5), HUBPR(100,5),HUBNOY(50),
310       3           IP(300),IPS(300),WSL(300),IPART(300),MSTRT(5),
311       4           LOTSZ(5),IXLOT,ETYPE(1000),BLNK(1000),MWLOT(1000),
312       5           EHD,ETL,ETLM,ALNK(300),TOTL(5),LHEAD,
313       6           QLOT(300), QPH(100,5), QPT(100,5), QKNT(100,5)
314        REAL FT,RT,SHOR,SETUP, PROTIM, YIELD, ST,AT,TINT,TSTRT,ETIME,
```

```
315     1            TIMEX,DT, MAINT, CUM,REST
316          DIMENSION FT(50), RT(50), SETUP(100,5), PROTIM(100,5),
317     1          YIELD(100,5), ST(300), AT(300), ETIME(1000),DT(300),
318     2          TINT(5), MAINT(1000),CUM(100,5),REST(100)
319 C
320          COMMON WSN,MACH,BS,MACHX,MSTAT,WSMACH,WSMX,MTOT,FT,RT
321          COMMON ETYPE,BLNK,MWLOT,EHD,ETL,ETLM,ETIME, MAINT
322          COMMON TIMEX, SHOR, TSTRT, TINT, MSTRT, LOTSZ, TOTL
323          COMMON PROCES,STPNUM,NUMPR,SETUP,PROTIM,YIELD,CUM,REST
324          COMMON HUBNO,HUBNOX,HUBPR,HUBNOY
325          COMMON ALNK,IP,IPS,WSL,IPART,ST,AT,IXLOT,DT,LHEAD
326          COMMON QLOT,QPH,QPT,QKNT
327          WRITE (*,100) EVMOL, TIMEX
328     100  FORMAT (' LOT START ',I5,' TIME IS ',F8.3)
329          IXLOT=ALNK(IXLOT)
330          CALL EVLM5(EVMOL)
331          RETURN
332          END

NUMBER OF WARNINGS IN PROGRAM UNIT: 0
NUMBER OF ERRORS   IN PROGRAM UNIT: 0

333 C
334 C
335          SUBROUTINE EVMU2(EVMOL)
336 C        UNLOAD A MACHINE
337          INTEGER*2 EVMOL, LOTID, LOTLOD
338          INCLUDE 'COMRAM.FOR'
339          INTEGER*2 WSN(50), MACH(50), BS(50), WSMX, MACHX(1000),WSMACH(50)
340     1         MSTAT(1000), MTOT, PROCES(100,5), STPNUM(5), NUMPR,
341     2         HUBNO(50,5), HUBNOX(50,5), HUBPR(100,5),HUBNOY(50),
342     3         IP(300),IPS(300),WSL(300),IPART(300),MSTRT(5),
343     4         LOTSZ(5),IXLOT,ETYPE(1000),BLNK(1000),MWLOT(1000),
344     5         EHD,ETL,ETLM,ALNK(300),TOTL(5),LHEAD,
345     6         QLOT(300), QPH(100,5), QPT(100,5), QKNT(100,5)
346          REAL FT,RT,SHOR,SETUP, PROTIM, YIELD, ST,AT,TINT,TSTRT,ETIME,
347     1          TIMEX,DT, MAINT, CUM,REST
348          DIMENSION FT(50), RT(50), SETUP(100,5), PROTIM(100,5),
349     1          YIELD(100,5), ST(300), AT(300), ETIME(1000),DT(300),
350     2          TINT(5), MAINT(1000),CUM(100,5),REST(100)
351 C
352          COMMON WSN,MACH,BS,MACHX,MSTAT,WSMACH,WSMX,MTOT,FT,RT
353          COMMON ETYPE,BLNK,MWLOT,EHD,ETL,ETLM,ETIME, MAINT
354          COMMON TIMEX, SHOR, TSTRT, TINT, MSTRT, LOTSZ, TOTL
355          COMMON PROCES,STPNUM,NUMPR,SETUP,PROTIM,YIELD,CUM,REST
356          COMMON HUBNO,HUBNOX,HUBPR,HUBNOY
357          COMMON ALNK,IP,IPS,WSL,IPART,ST,AT,IXLOT,DT,LHEAD
358          COMMON QLOT,QPH,QPT,QKNT
359          WRITE(*,100) EVMOL,TIMEX
360     100  FORMAT(' MACHINE UNLOAD ', I5,' TIME IS ',F8.3)
361          MSTAT(EVMOL)=-1
362          LOTID=MWLOT(EVMOL)
363          CALL EVLM5(LOTID)
364          IF (MAINT(EVMOL).LE.TIMEX) GOTO 900
365          CALL QUEUE(WSNE(EVMOL), LOTLOD)
366          IF (LOTLOD.EQ.0) GOTO 1000
367          CALL EVML6(LOTID,LOTLOD)
368          GOTO 1000
369     900  CONTINUE
370 C        MACHINE IS SCHEDULED TO FAIL
371          MAINT(EVMOL)=TIMEX
372          CALL EVMD3(EVMOL)
373     1000 CONTINUE
374          RETURN
375          END
NUMBER OF WARNINGS IN PROGRAM UNIT: 0
NUMBER OF ERRORS   IN PROGRAM UNIT: 0
```

```
376   C
377   C
378         SUBROUTINE EVMD3(MSN)
379   C     MACHINE GOES DOWN
380         INTEGER*2 MSN, WSKK
381         REAL TIME
382         INCLUDE 'COMRAM.FOR'
383         INTEGER*2 WSN(50), MACH(50), BS(50), WSMX, MACHX(1000),WSMACH(50),
384        1           MSTAT(1000), MTOT, PROCES(100,5), STPNUM(5), NUMPR,
385        2           HUBNO(50,5), HUBNOX(50,5), HUBPR(100,5),HUBNOY(50),
386        3           IP(300),IPS(300),WSL(300),IPART(300),MSTRT(5),
387        4           LOTSZ(5),IXLOT,ETYPE(1000),BLNK(1000),MWLOT(1000),
388        5           EHD,ETL,ETLM,ALNK(300),TOTL(5),LHEAD,
389        6           QLOT(300), QPH(100,5), QPT(100,5), QKNT(100,5)
390         REAL FT,RT,SHOR,SETUP, PROTIM, YIELD, ST,AT,TINT,TSTRT,ETIME,
391        1           TIMEX,DT, MAINT, CUM,REST
392         DIMENSION FT(50), RT(50), SETUP(100,5), PROTIM(100,5),
393        1           YIELD(100,5), ST(300), AT(300), ETIME(1000),DT(300),
394        2           TINT(5), MAINT(1000),CUM(100,5),REST(100)
395   C
396         COMMON WSN,MACH,BS,MACHX,MSTAT,WSMACH,WSMX,MTOT,FT,RT
397         COMMON ETYPE,BLNK,MWLOT,EHD,ETL,ETLM,ETIME, MAINT
398         COMMON TIMEX, SHOR, TSTRT, TINT, MSTRT, LOTSZ, TOTL
399         COMMON PROCES,STPNUM,NUMPR,SETUP,PROTIM,YIELD,CUM,REST
400         COMMON HUBNO,HUBNOX,HUBPR,HUBNOY
401         COMMON ALNK,IP,IPS,WSL,IPART,ST,AT,IXLOT,DT,LHEAD
402         COMMON QLOT,QPH,QPT,QKNT
403         WRITE(*,100) MSN,TIMEX
404   100   FORMAT(' MACHINE FAILS ', I5,'TIME IS ',F8.3)
405         MSTAT(MSN)=-2
406         WSKK=WSNE(MSN)
407         TIME=TIMEX+RT(WSKK)
408         ETIME(MSN)=TIME
409         ETYPE(MSN)=3
410         CALL SCHED(MSN,3,TIME)
411         RETURN
412         END
```

NUMBER OF WARNINGS IN PROGRAM UNIT: 0
NUMBER OF ERRORS   IN PROGRAM UNIT: 0

```
413   C
414   C
415         SUBROUTINE EVMR4(MSN)
416   C     MACHINE IS REPAIRED
417         INCLUDE 'COMRAM.FOR'
418         INTEGER*2 WSN(50), MACH(50), BS(50), WSMX, MACHX(1000),WSMACH(50),
419        1           MSTAT(1000), MTOT, PROCES(100,5), STPNUM(5), NUMPR,
420        2           HUBNO(50,5), HUBNOX(50,5), HUBPR(100,5),HUBNOY(50),
421        3           IP(300),IPS(300),WSL(300),IPART(300),MSTRT(5),
422        4           LOTSZ(5),IXLOT,ETYPE(1000),BLNK(1000),MWLOT(1000),
423        5           EHD,ETL,ETLM,ALNK(300),TOTL(5),LHEAD,
424        6           QLOT(300), QPH(100,5), QPT(100,5), QKNT(100,5)
425         REAL FT,RT,SHOR,SETUP, PROTIM, YIELD, ST,AT,TINT,TSTRT,ETIME,
426        1           TIMEX,DT, MAINT, CUM,REST
427         DIMENSION FT(50), RT(50), SETUP(100,5), PROTIM(100,5),
428        1           YIELD(100,5), ST(300), AT(300), ETIME(1000),DT(300),
429        2           TINT(5), MAINT(1000),CUM(100,5),REST(100)
430   C
431         COMMON WSN,MACH,BS,MACHX,MSTAT,WSMACH,WSMX,MTOT,FT,RT
432         COMMON ETYPE,BLNK,MWLOT,EHD,ETL,ETLM,ETIME, MAINT
433         COMMON TIMEX, SHOR, TSTRT, TINT, MSTRT, LOTSZ, TOTL
434         COMMON PROCES,STPNUM,NUMPR,SETUP,PROTIM,YIELD,CUM,REST
435         COMMON HUBNO,HUBNOX,HUBPR,HUBNOY
436         COMMON ALNK,IP,IPS,WSL,IPART,ST,AT,IXLOT,DT,LHEAD
```

```
437       COMMON QLOT,QPH,QPT,QKNT
438       WRITE(*,100) MSN,TIMEX
439  100  FORMAT(' MACHINE IS REPAIRED',I5,' TIME IS',F8.3)
440       MSTAT(MSN)=-1
441       CALL QUEUE(WSNE(MSN),LOTLOD)
442       IF (LOTLOD.EQ.0) GOTO 1000
443       CALL EVML6(LOTLOD,MSN)
444  1000 CONTINUE
445       RETURN
446       END
```

NUMBER OF WARNINGS IN PROGRAM UNIT: 0
NUMBER OF ERRORS   IN PROGRAM UNIT: 0

```
447 C
448 C
449       SUBROUTINE EVLM5(LOTID)
450       INTEGER*2 LOTID,PROD,INDEX,INDEXB,INDEXC,INDEXD,INDEXE,MCK
451       INCLUDE 'COMRAM.FOR'
452       INTEGER*2 WSN(50), MACH(50), BS(50), WSMX, MACHX(1000),WSMACH(50),
453      1          MSTAT(1000), MTOT, PROCES(100,5), STPNUM(5), NUMPR,
454      2          HUBNO(50,5), HUBNOX(50,5), HUBPR(100,5),HUBNOY(50),
455      3          IP(300),IPS(300),WSL(300),IPART(300),MSTRT(5),
456      4          LOTSZ(5),IXLOT,ETYPE(1000),BLNK(1000),MWLOT(1000),
457      5          EHD,ETL,ETLM,ALNK(300),TOTL(5),LHEAD,
458      6          QLOT(300), QPH(100,5), QPT(100,5), QKNT(100,5)
459       REAL FT,RT,SHOR,SETUP, PROTIM, YIELD, ST,AT,TINT,TSTRT,ETIME,
460      1          TIMEX,DT, MAINT, CUM,REST
461       DIMENSION FT(50), RT(50), SETUP(100,5), PROTIM(100,5),
462      1          YIELD(100,5), ST(300), AT(300), ETIME(1000),DT(300),
463      2          TINT(5), MAINT(1000),CUM(100,5),REST(100)
464 C
465       COMMON WSN,MACH,BS,MACHX,MSTAT,WSMACH,WSMX,MTOT,FT,RT
466       COMMON ETYPE,BLNK,MWLOT,EHD,ETL,ETLM,ETIME, MAINT
467       COMMON TIMEX, SHOR, TSTRT, TINT, MSTRT, LOTSZ, TOTL
468       COMMON PROCES,STPNUM,NUMPR,SETUP,PROTIM,YIELD,CUM,REST
469       COMMON HUBNO,HUBNOX,HUBPR,HUBNOY
470       COMMON ALNK,IP,IPS,WSL,IPART,ST,AT,IXLOT,DT,LHEAD
471       COMMON QLOT,QPH,QPT,QKNT
472 C
473       WRITE (*,100) LOTID,TIMEX
474  100  FORMAT(' LOT MOVE', I5,' TIME IS',F8.3)
475 C     LOTID IS THE LOCATION IN THE LOT LIST
476       PROD=IP(LOTID)
477       INDEXB=IPS(LOTID)
478       IPS(LOTID)=IPS(LOTID)+1
479       INDEX=IPS(LOTID)
480       IF (INDEX.GT.STPNUM(PROD)) GOTO 1000
481       IPART(LOTID)=LOTSZ(PROD)*CUM(INDEX,PROD)
482 C     INCREMENT QUEUE
483       QKNT(INDEX,PROD)=QKNT(INDEX,PROD)+1
484       IF (QKNT(INDEX,PROD).EQ.1) THEN
485            QPH(INDEX,PROD)=LOTID
486            QPT(INDEX,PROD)=LOTID
487       ELSE IF (INDEXB.EQ.0) THEN
488            QLOT(LOTID)=QPH(INDEX,PROD)
489            QPH(INDEX,PROD)=LOTID
490       ELSE
491 C     MOVE A LOT TO NEXT QUEUE
492            INDEXD=QPH(INDEXB,PROD)
493            INDEXE=QLOT(INDEXD)
494 C     CHANGE TAIL OF NEW QUEUE
495            INDEXC=QPT(INDEX,PROD)
496            QLOT(INDEXC)=LOTID
497            QPT(INDEX,PROD)=QPH(INDEXB,PROD)
```

```
498              QLOT(LOTID)=0
499  C    CHANGE HEAD OF OLD QUEUE
500              QPH(INDEXB,PROD)=INDEXE
501              QKNT(INDEXB,PROD)=QKNT(INDEXB,PROD)-1
502          END IF
503  C    ASSIGN LOT TO WORKSTATION
504          WSL(LOTID)=PROCES(INDEX,PROD)
505  C    DETERMINE IF MACHINE IS AVAILABLE
506          CALL WORK(WSL(LOTID),MCK)
507          IF (MCK.EQ.0) GOTO 1000
508          CALL EVML6(LOTID,MCK)
509  1000 CONTINUE
510          RETURN
511          END
```

NUMBER OF WARNINGS IN PROGRAM UNIT: 0
NUMBER OF ERRORS   IN PROGRAM UNIT: 0

```
512  C
513  C
514          SUBROUTINE EVML6(LOTID,MSN)
515  C    LOAD A MACHINE
516  C    MSN      MACHINE NUMBER
517  C    LOTID    LOT ID
518          INTEGER*2 LOTID,MSN,PSTEP,PROD
519          INCLUDE 'COMRAM.FOR'
520          INTEGER*2 WSN(50), MACH(50), BS(50), WSMX, MACHX(1000),WSMACH(50),
521      1           MSTAT(1000), MTOT, PROCES(100,5), STPNUM(5), NUMPR,
522      2           HUBNO(50,5), HUBNOX(50,5), HUBPR(100,5),HUBNOY(50),
523      3           IP(300),IPS(300),WSL(300),IPART(300),MSTRT(5),
524      4           LOTSZ(5),IXLOT,ETYPE(1000),BLNK(1000),MWLOT(1000),
525      5           EHD,ETL,ETLM,ALNK(300),TOTL(5),LHEAD,
526      6           QLOT(300), QPH(100,5), QPT(100,5), QKNT(100,5)
527        REAL FT,RT,SHOR,SETUP, PROTIM, YIELD, ST,AT,TINT,TSTRT,ETIME,
528      1           TIMEX,DT, MAINT, CUM,REST
529        DIMENSION FT(50), RT(50), SETUP(100,5), PROTIM(100,5),
530      1           YIELD(100,5), ST(300), AT(300), ETIME(1000),DT(300),
531      2           TINT(5), MAINT(1000),CUM(100,5),REST(100)
532  C
533        COMMON WSN,MACH,BS,MACHX,MSTAT,WSMACH,WSMX,MTOT,FT,RT
534        COMMON ETYPE,BLNK,MWLOT,EHD,ETL,ETLM,ETIME, MAINT
535        COMMON TIMEX, SHOR, TSTRT, TINT, MSTRT, LOTSZ, TOTL
536        COMMON PROCES,STPNUM,NUMPR,SETUP,PROTIM,YIELD,CUM,REST
537        COMMON HUBNO,HUBNOX,HUBPR,HUBNOY
538        COMMON ALNK,IP,IPS,WSL,IPART,ST,AT,IXLOT,DT,LHEAD
539        COMMON QLOT,QPH,QPT,QKNT
540              WRITE (*,100) LOTID,MSN,TIMEX
541  100      FORMAT(' MACHINE LOAD, LOT',I5,' MACHINE',I5, ' TIME',F8.3)
542        MSTAT(MSN)=0
543        MWLOT(MSN)=LOTID
544        PROD =IP(LOTID)
545        PSTEP =IPS(LOTID)
546        ETIME(MSN)=TIMEX+ PROTIM(PSTEP,PROD)
547        ETYPE(MSN)=2
548        CALL SCHED (MSN,2,ETIME(MSN))
549        RETURN
550        END
```

NUMBER OF WARNINGS IN PROGRAM UNIT: 0
NUMBER OF ERRORS   IN PROGRAM UNIT: 0

```
551         SUBROUTINE QUEUE(WS,LOT)
552 C       EVALUATES INVENTORY AT WORK STATION
553 C       WS    NUMBER OF WORKSTATION
554 C       LOT   ID OF LOT SELECTED FROM QUEUE
555 C       BASED UPON DISPATCH SCHEME: PROCESS, LATEST STEPS FIRST, FIFO
556         INTEGER*2 WS,LOT,I,J,START,END,STEP,PROD,HEAD
557         INCLUDE 'COMRAM.FOR'
558         INTEGER*2 WSN(50), MACH(50), BS(50), WSMX, MACHX(1000),WSMACH(50),
559      1       MSTAT(1000), MTOT, PROCES(100,5), STPNUM(5), NUMPR,
560      2       HUBNO(50,5), HUBNOX(50,5), HUBPR(100,5),HUBNOY(50),
561      3       IP(300),IPS(300),WSL(300),IPART(300),MSTRT(5),
562      4       LOTSZ(5),IXLOT,ETYPE(1000),BLNK(1000),MWLOT(1000),
563      5       EHD,ETL,ETLM,ALNK(300),TOTL(5),LHEAD,
564      6       QLOT(300), QPH(100,5), QPT(100,5), QKNT(100,5)
565         REAL FT,RT,SHOR,SETUP, PROTIM, YIELD, ST,AT,TINT,TSTRT,ETIME,
566      1       TIMEX,DT, MAINT, CUM,REST
567         DIMENSION FT(50), RT(50), SETUP(100,5), PROTIM(100,5),
568      1          YIELD(100,5), ST(300), AT(300), ETIME(1000),DT(300),
569      2          TINT(5), MAINT(1000),CUM(100,5),REST(100)
570 C
571         COMMON WSN,MACH,BS,MACHX,MSTAT,WSMACH,WSMX,MTOT,FT,RT
572         COMMON ETYPE,BLNK,MWLOT,EHD,ETL,ETLM,ETIME, MAINT
573         COMMON TIMEX, SHOR, TSTRT, TINT, MSTRT, LOTSZ, TOTL
574         COMMON PROCES,STPNUM,NUMPR,SETUP,PROTIM,YIELD,CUM,REST
575         COMMON HUBNO,HUBNOX,HUBPR,HUBNOY
576         COMMON ALNK,IP,IPS,WSL,IPART,ST,AT,IXLOT,DT,LHEAD
577         COMMON QLOT,QPH,QPT,QKNT
578         DO 500 J=1,NUMPR
579            START=HUBNOX(WS,J)
580            END=HUBNOX(WS,J)+HUBNO(WS,J)-1
581            DO 400 I=END,START,-1
582               PROD=J
583               STEP=HUBPR(I,J)
584               IF (QKNT(STEP,PROD).EQ.0) GOTO 400
585               GOTO 800
586     400    CONTINUE
587     500 CONTINUE
588 C       THERE ARE NO LOTS IN THE QUEUES
589         LOT=0
590         GOTO 1000
591     800 CONTINUE
592 C       BASED UPON DISPATCH SCHEME, THE FIRST QUEUE WITH LOTS
593         HEAD=QPH(STEP,PROD)
594         LOT=QLOT(HEAD)
595    1000 CONTINUE
596         RETURN
597         END
```

NUMBER OF WARNINGS IN PROGRAM UNIT: 0
NUMBER OF ERRORS   IN PROGRAM UNIT: 0

```
598 C
599 C
600         SUBROUTINE WORK(WNUM,WVAL)
601 C       CHECK IF MACHINE IS AVAILABLE
602         INTEGER*2 WNUM,WVAL,START,END
603 C       WNUM    NUMBER OF WORK STATION
604 C       WVAL    IS NUMBER OF FIRST EMPTY MACHINE, ZERO IF NONE
605         INCLUDE 'COMRAM.FOR'
606         INTEGER*2 WSN(50), MACH(50), BS(50), WSMX, MACHX(1000),WSMACH(50),
607      1       MSTAT(1000), MTOT, PROCES(100,5), STPNUM(5), NUMPR,
608      2       HUBNO(50,5), HUBNOX(50,5), HUBPR(100,5),HUBNOY(50),
609      3       IP(300),IPS(300),WSL(300),IPART(300),MSTRT(5),
610      4       LOTSZ(5),IXLOT,ETYPE(1000),BLNK(1000),MWLOT(1000),
611      5       EHD,ETL,ETLM,ALNK(300),TOTL(5),LHEAD,
612      6       QLOT(300), QPH(100,5), QPT(100,5), QKNT(100,5)
```

```
613         REAL FT,RT,SHOR,SETUP, PROTIM, YIELD, ST,AT,TINT,TSTRT,ETIME,
614        1        TIMEX,DT, MAINT, CUM,REST
615         DIMENSION FT(50), RT(50), SETUP(100,5), PROTIM(100,5),
616        1        YIELD(100,5), ST(300), AT(300), ETIME(1000),DT(300),
617        2        TINT(5), MAINT(1000),CUM(100,5),REST(100)
618 C
619         COMMON WSN,MACH,BS,MACHX,MSTAT,WSMACH,WSMX,MTOT,FT,RT
620         COMMON ETYPE,BLNK,MWLOT,EHD,ETL,ETLM,ETIME, MAINT
621         COMMON TIMEX, SHOR, TSTRT, TINT, MSTRT, LOTSZ, TOTL
622         COMMON PROCES,STPNUM,NUMPR,SETUP,PROTIM,YIELD,CUM,REST
623         COMMON HUBNO,HUBNOX,HUBPR,HUBNOY
624         COMMON ALNK,IP,IPS,WSL,IPART,ST,AT,IXLOT,DT,LHEAD
625         COMMON QLOT,QPH,QPT,QKNT
626         WVAL=0
627         START=WSMACH(WNUM)
628         END=START+MACH(WNUM)-1
629   100 IF(MSTAT(START).EQ. -1) GOTO 900
630         IF (START.EQ.END) GOTO 1000
631         START=START+1
632         GOTO 100
633   900 CONTINUE
634         WVAL=START
635  1000 CONTINUE
636         RETURN
637         END

NUMBER OF WARNINGS IN PROGRAM UNIT: 0
NUMBER OF ERRORS   IN PROGRAM UNIT: 0

638 C
639         SUBROUTINE LOTINP(LOTST)
640 C   LOTST       NAME OF FILE WITH LOT SET INFORMATION
641 C   MSTRT       MULTIPLE STARTS
642 C   TINT        START INTERVALS
643         CHARACTER*12 LOTST
644         INTEGER*2 KP, I
645         INCLUDE 'COMRAM.FOR'
646         INTEGER*2 WSN(50), MACH(50), BS(50), WSMX, MACHX(1000),WSMACH(50),
647        1        MSTAT(1000), MTOT, PROCES(100,5), STPNUM(5), NUMPR,
648        2        HUBNO(50,5), HUBNOX(50,5), HUBPR(100,5),HUBNOY(50),
649        3        IP(300),IPS(300),WSL(300),IPART(300),MSTRT(5),
650        4        LOTSZ(5),IXLOT,ETYPE(1000),BLNK(1000),MWLOT(1000),
651        5        EHD,ETL,ETLM,ALNK(300),TOTL(5),LHEAD,
652        6        QLOT(300), QPH(100,5), QPT(100,5), QKNT(100,5)
653         REAL FT,RT,SHOR,SETUP, PROTIM, YIELD, ST,AT,TINT,TSTRT,ETIME,
654        1        TIMEX,DT, MAINT, CUM,REST
655         DIMENSION FT(50), RT(50), SETUP(100,5), PROTIM(100,5),
656        1        YIELD(100,5), ST(300), AT(300), ETIME(1000),DT(300),
657        2        TINT(5), MAINT(1000),CUM(100,5),REST(100)
658 C
659         COMMON WSN,MACH,BS,MACHX,MSTAT,WSMACH,WSMX,MTOT,FT,RT
660         COMMON ETYPE,BLNK,MWLOT,EHD,ETL,ETLM,ETIME, MAINT
661         COMMON TIMEX, SHOR, TSTRT, TINT, MSTRT, LOTSZ, TOTL
662         COMMON PROCES,STPNUM,NUMPR,SETUP,PROTIM,YIELD,CUM,REST
663         COMMON HUBNO,HUBNOX,HUBPR,HUBNOY
664         COMMON ALNK,IP,IPS,WSL,IPART,ST,AT,IXLOT,DT,LHEAD
665         COMMON QLOT,QPH,QPT,QKNT
666         NU=1
667         OPEN(NU,FILE=LOTST)
668         DO 50 I=1,NUMPR
669         READ(NU,100) KP,LOTSZ(I),TINT(I),MSTRT(I)
670    50 CONTINUE
671   100 FORMAT(2I4,F8.2,I4)
672         CLOSE(NU)
```

```
673         RETURN
674         END

NUMBER OF WARNINGS IN PROGRAM UNIT: 0
NUMBER OF ERRORS   IN PROGRAM UNIT: 0

675  C
676         SUBROUTINE HUBNOK(X)
677         INTEGER*2 I,J,K,L,INDEX
678         INCLUDE 'COMRAM.FOR'
679         INTEGER*2 WSN(50), MACH(50), BS(50), WSMX, MACHX(1000),WSMACH(50),
680      1            MSTAT(1000), MTOT, PROCES(100,5), STPNUM(5), NUMPR,
681      2            HUBNO(50,5), HUBNOX(50,5), HUBPR(100,5),HUBNOY(50),
682      3            IP(300),IPS(300),WSL(300),IPART(300),MSTRT(5),
683      4            LOTSZ(5),IXLOT,ETYPE(1000),BLNK(1000),MWLOT(1000),
684      5            EHD,ETL,ETLM,ALNK(300),TOTL(5),LHEAD,
685      6            QLOT(300), QPH(100,5), QPT(100,5), QKNT(100,5)
686         REAL FT,RT,SHOR,SETUP, PROTIM, YIELD, ST,AT,TINT,TSTRT,ETIME,
687      1         TIMEX,DT, MAINT, CUM,REST
688         DIMENSION FT(50), RT(50), SETUP(100,5), PROTIM(100,5),
689      1         YIELD(100,5), ST(300), AT(300), ETIME(1000),DT(300),
690      2         TINT(5), MAINT(1000),CUM(100,5),REST(100)
691  C
692         COMMON WSN,MACH,BS,MACHX,MSTAT,WSMACH,WSMX,MTOT,FT,RT
693         COMMON ETYPE,BLNK,MWLOT,EHD,ETL,ETLM,ETIME, MAINT
694         COMMON TIMEX, SHOR, TSTRT, TINT, MSTRT, LOTSZ, TOTL
695         COMMON PROCES,STPNUM,NUMPR,SETUP,PROTIM,YIELD,CUM,REST
696         COMMON HUBNO,HUBNOX,HUBPR,HUBNOY
697         COMMON ALNK,IP,IPS,WSL,IPART,ST,AT,IXLOT,DT,LHEAD
698         COMMON QLOT,QPH,QPT,QKNT
699  C      SUBROUTINE ANALYZES THE HUB STRUCTURE OF SET OF PROCESSES
700         WRITE (*,10)
701   10    FORMAT (' NOW IN HUBNOK')
702         DO 30 I=1,NUMPR
703            DO 20 J=1,WSMX
704               HUBNO(J,I)=0
705   20       CONTINUE
706   30    CONTINUE
707         DO 60 I=1,NUMPR
708            DO 50 J=1,STPNUM(I)
709               DO 40 K=1,WSMX
710                  IF (PROCES(J,I).NE.K) GOTO 40
711                  HUBNO(K,I)=HUBNO(K,I)+1
712  C               WRITE(*,*) I,J,K,HUBNO(K,I)
713                  GOTO 50
714   40          CONTINUE
715   50       CONTINUE
716   60    CONTINUE
717         DO 200 I=1,NUMPR
718            DO 70 L=1,WSMX
719               HUBNOY(L)=0
720   70       CONTINUE
721            HUBNOX(1,I)=1
722            DO 80 J=2,WSMX
723               INDEX=J-1
724               HUBNOX(J,I)=HUBNOX(INDEX,I)+HUBNO(INDEX,I)
725  C            WRITE(*,*) I,J,HUBNO(J,I),HUBNOX(J,I)
726   80       CONTINUE
727            DO 100 J=1,STPNUM(I)
728               DO 90 K=1,WSMX
729                  IF (PROCES(J,I).NE.K) GOTO 90
730                  INDEX=HUBNOX(K,I)+HUBNOY(K)
731                  HUBPR(INDEX,I)=J
732                  HUBNOY(K)=HUBNOY(K)+1
733  C               WRITE (*,*) I,J,INDEX,HUBPR(INDEX,I)
```

```
734                         GOTO 100
735      90           CONTINUE
736     100         CONTINUE
737     200 CONTINUE
738          RETURN
739          END
```

NUMBER OF WARNINGS IN PROGRAM UNIT: 0
NUMBER OF ERRORS   IN PROGRAM UNIT: 0

```
740 C
741 C
742         SUBROUTINE HUBOUT(X)
743 C       PRINTS OUT HUB ANALYSIS
744         INCLUDE 'COMRAM.FOR'
745         INTEGER*2 WSN(50), MACH(50), BS(50), WSMX, MACHX(1000),WSMACH(50),
746      1            MSTAT(1000), MTOT, PROCES(100,5), STPNUM(5), NUMPR,
747      2            HUBNO(50,5), HUBNOX(50,5), HUBPR(100,5),HUBNOY(50),
748      3            IP(300), IPS(300),WSL(300),IPART(300),MSTRT(5),
749      4            LOTSZ(5),IXLOT,ETYPE(1000),BLNK(1000),MWLOT(1000),
750      5            EHD,ETL,ETLM,ALNK(300),TOTL(5),LHEAD,
751      6            QLOT(300), QPH(100,5), QPT(100,5), QKNT(100,5)
752         REAL FT,RT,SHOR,SETUP, PROTIM, YIELD, ST,AT,TINT,TSTRT,ETIME,
753      1       TIMEX,DT, MAINT, CUM,REST
754         DIMENSION FT(50), RT(50), SETUP(100,5), PROTIM(100,5),
755      1             YIELD(100,5), ST(300), AT(300), ETIME(1000),DT(300),
756      2             TINT(5), MAINT(1000),CUM(100,5),REST(100)
757 C
758         COMMON WSN,MACH,BS,MACHX,MSTAT,WSMACH,WSMX,MTOT,FT,RT
759         COMMON ETYPE,BLNK,MWLOT,EHD,ETL,ETLM,ETIME, MAINT
760         COMMON TIMEX, SHOR, TSTRT, TINT, MSTRT, LOTSZ, TOTL
761         COMMON PROCES,STPNUM,NUMPR,SETUP,PROTIM,YIELD,CUM,REST
762         COMMON HUBNO,HUBNOX,HUBPR,HUBNOY
763         COMMON ALNK,IP,IPS,WSL,IPART,ST,AT,IXLOT,DT,LHEAD
764         COMMON QLOT,QPH,QPT,QKNT
765 C       WRITE (*,5)
766 C     5 FORMAT(' NOW IN HUBOUT')
767
768         DO 1000 I=1,NUMPR
769             WRITE (*,10)
770      10     FORMAT (' PROCESS NUMBER ')
771             WRITE (*,*) I
772             WRITE (*,*)
773             WRITE (*,20)
774      20     FORMAT (' HUB NUMBER              HUB SET MARKER')
775             DO 30 J=1,WSMX
776                 WRITE (*,*) J,HUBNO(J,I),HUBNOX(J,I)
777      30     CONTINUE
778             WRITE (*,*)
779             WRITE (*,40)
780             WRITE (*,*)
781      40     FORMAT (' HUB SETS IN ORDER')
782 C
783             DO 500 J=1,WSMX
784                 WRITE (*,50) J
785      50         FORMAT (' WORKSTATION ',I4)
786                 WRITE (*,60)
787      60         FORMAT (' PROCESS STEPS ASSIGNED')
788                 START=HUBNOX(J,I)
789                 END=HUBNOX(J,I)+HUBNO(J,I)-1
790                 DO 450 K=START,END
791                     WRITE (*,*) J,HUBPR(K,I)
792      450        CONTINUE
793      500    CONTINUE
794     1000 CONTINUE
```

```
795         RETURN
796         END
```

NUMBER OF WARNINGS IN PROGRAM UNIT: 0
NUMBER OF ERRORS   IN PROGRAM UNIT: 0

```
797 C
798 C
799         SUBROUTINE PRINP(FABDES,K)
800 C       PRINP     CONTAINS NAME OF PROCESS FILE
801 C       K         COLUMN TO LOAD PROCESS DATA
802         INTEGER*2 K, KD, STPNM,NU
803         CHARACTER*12 FABDES
804         INCLUDE 'COMRAM.FOR'
805         INTEGER*2 WSN(50), MACH(50), BS(50), WSMX, MACHX(1000),WSMACH(50),
806     1         MSTAT(1000), MTOT, PROCES(100,5), STPNUM(5), NUMPR,
807     2         HUBNO(50,5), HUBNOX(50,5), HUBPR(100,5),HUBNOY(50),
808     3         IP(300),IPS(300),WSL(300),IPART(300),MSTRT(5),
809     4         LOTSZ(5),IXLOT,ETYPE(1000),BLNK(1000),MWLOT(1000),
810     5         EHD,ETL,ETLM,ALNK(300),TOTL(5),LHEAD,
811     6         QLOT(300), QPH(100,5), QPT(100,5), QKNT(100,5)
812       REAL FT,SHOR,SETUP, PROTIM, YIELD, ST,AT,TINT,TSTRT,ETIME,
813     1         TIMEX,DT, MAINT, CUM,REST
814       DIMENSION FT(50), RT(50), SETUP(100,5), PROTIM(100,5),
815     1         YIELD(100,5), ST(300), AT(300), ETIME(1000),DT(300),
816     2         TINT(5), MAINT(1000),CUM(100,5),REST(100)
817 C
818       COMMON WSN,MACH,BS,MACHX,MSTAT,WSMACH,WSMX,MTOT,FT,RT
819       COMMON ETYPE,BLNK,MWLOT,EHD,ETL,ETLM,ETIME, MAINT
820       COMMON TIMEX, SHOR, TSTRT, TINT, MSTRT, LOTSZ, TOTL
821       COMMON PROCES,STPNUM,NUMPR,SETUP,PROTIM,YIELD,CUM,REST
822       COMMON HUBNO,HUBNOX,HUBPR,HUBNOY
823       COMMON ALNK,IP,IPS,WSL,IPART,ST,AT,IXLOT,DT,LHEAD
824       COMMON QLOT,QPH,QPT,QKNT
825       NU=2
826       STPNM=1
827       OPEN (NU, FILE=FABDES)
828 100   CONTINUE
829       READ (NU,110,END=500) KD, PROCES(STPNM,K), SETUP(STPNM,K),
830     1                      PROTIM(STPNM,K), YIELD(STPNM,K)
831 110   FORMAT (2I4,3F8.2)
832         STPNM=STPNM+1
833         GOTO 100
834 500 CONTINUE
835       STPNUM(K)=STPNM-1
836       CLOSE(NU)
837       RETURN
838       END
```

NUMBER OF WARNINGS IN PROGRAM UNIT: 0
NUMBER OF ERRORS   IN PROGRAM UNIT: 0

```
839 C
840 C
841         SUBROUTINE WKINP(FABDES)
842 C       FABDES    NAME OF WORKSTATION DESCRIPTION FILE
843         INTEGER*2 NU
844         CHARACTER*12 FABDES
845         INCLUDE 'COMRAM.FOR'
846         INTEGER*2 WSN(50), MACH(50), BS(50), WSMX, MACHX(1000),WSMACH(50),
```

```
847            1          MSTAT(1000), MTOT, PROCES(100,5), STPNUM(5), NUMPR,
848            2          HUBNO(50,5), HUBNOX(50,5), HUBPR(100,5),HUBNOY(50),
849            3          IP(300),IPS(300),WSL(300),IPART(300),MSTRT(5),
850            4          LOTSZ(5),IXLOT,ETYPE(1000),BLNK(1000),MWLOT(1000),
851            5          EHD,ETL,ETLM,ALNK(300),TOTL(5),LHEAD,
852            6          QLOT(300), QPH(100,5), QPT(100,5), QKNT(100,5)
853         REAL FT,RT,SHOR,SETUP, PROTIM, YIELD, ST,AT,TINT,TSTRT,ETIME,
854            1          TIMEX,DT, MAINT, CUM,REST
855         DIMENSION FT(50), RT(50), SETUP(100,5), PROTIM(100,5),
856            1          YIELD(100,5), ST(300), AT(300), ETIME(1000),DT(300),
857            2          TINT(5), MAINT(1000),CUM(100,5),REST(100)
858   C
859         COMMON WSN,MACH,BS,MACHX,MSTAT,WSMACH,WSMX,MTOT,FT,RT
860         COMMON ETYPE,BLNK,MWLOT,EHD,ETL,ETLM,ETIME, MAINT
861         COMMON TIMEX, SHOR, TSTRT, TINT, MSTRT, LOTSZ, TOTL
862         COMMON PROCES,STPNUM,NUMPR,SETUP,PROTIM,YIELD,CUM,REST
863         COMMON HUBNO,HUBNOX,HUBPR,HUBNOY
864         COMMON ALNK,IP,IPS,WSL,IPART,ST,AT,IXLOT,DT,LHEAD
865         COMMON QLOT,QPH,QPT,QKNT
866         NU=1
867         WSMX=1
868         OPEN (NU, FILE=FABDES)
869   100   CONTINUE
870         READ (NU,110,END=500) WSN(WSMX), MACH(WSMX), BS(WSMX), FT(WSMX),
871            1          RT(WSMX)
872   110   FORMAT (3I4,2F8.2)
873         WSMX=WSMX+1
874         GOTO 100
875   500 CONTINUE
876         WSMX=WSMX-1
877         CLOSE(NU)
878         RETURN
879         END
```

NUMBER OF WARNINGS IN PROGRAM UNIT: 0
NUMBER OF ERRORS   IN PROGRAM UNIT: 0

```
880   C
881   C
882         SUBROUTINE WSNE(X)
883   C     INITIALIZES MACHINE ARRAY
884         INTEGER*2 IST, ILST
885         INCLUDE 'COMRAM.FOR'
886         INTEGER*2 WSN(50), MACH(50), BS(50), WSMX, MACHX(1000),WSMACH(50),
887            1          MSTAT(1000), MTOT, PROCES(100,5), STPNUM(5), NUMPR,
888            2          HUBNO(50,5), HUBNOX(50,5), HUBPR(100,5),HUBNOY(50),
889            3          IP(300),IPS(300),WSL(300),IPART(300),MSTRT(5),
890            4          LOTSZ(5),IXLOT,ETYPE(1000),BLNK(1000),MWLOT(1000),
891            5          EHD,ETL,ETLM,ALNK(300),TOTL(5),LHEAD,
892            6          QLOT(300), QPH(100,5), QPT(100,5), QKNT(100,5)
893         REAL FT,RT,SHOR,SETUP, PROTIM, YIELD, ST,AT,TINT,TSTRT,ETIME,
894            1          TIMEX,DT, MAINT, CUM,REST
895         DIMENSION FT(50), RT(50), SETUP(100,5), PROTIM(100,5),
896            1          YIELD(100,5), ST(300), AT(300), ETIME(1000),DT(300),
897            2          TINT(5), MAINT(1000),CUM(100,5),REST(100)
898   C
899         COMMON WSN,MACH,BS,MACHX,MSTAT,WSMACH,WSMX,MTOT,FT,RT
900         COMMON ETYPE,BLNK,MWLOT,EHD,ETL,ETLM,ETIME, MAINT
901         COMMON TIMEX, SHOR, TSTRT, TINT, MSTRT, LOTSZ, TOTL
902         COMMON PROCES,STPNUM,NUMPR,SETUP,PROTIM,YIELD,CUM,REST
903         COMMON HUBNO,HUBNOX,HUBPR,HUBNOY
904         COMMON ALNK,IP,IPS,WSL,IPART,ST,AT,IXLOT,DT,LHEAD
905         COMMON QLOT,QPH,QPT,QKNT
906         IST=1
907         ILST=MACH(1)
```

```
908          DO 1000 K=1, WSMX
909             WSMACH(K)=IST
910             DO 900 I=IST,ILST
911                MACHX(I)=WSN(K)
912                MSTAT(I)=-1
913  900        CONTINUE
914             IF (K.EQ.WSMX) GOTO 1000
915             IST=IST+MACH(K)
916             ILST=ILST+MACH(K+1)
917 1000     CONTINUE
918          MTOT=ILST
919 C        LINK LIST BLNK
920          EHD=0
921          ETL=0
922          ETLM=0
923          BLNK(MTOT)=0
924          DO 1100 I=2,MTOT
925             BLNK(I-1)=I
926 1100     CONTINUE
927          DO 1200 I=1,MTOT
928             ETYPE(I)=0
929             MWLOT(I)=0
930             ETIME(I)=0.
931             MAINT(I)=0.
932 1200     CONTINUE
933          RETURN
934          END

NUMBER OF WARNINGS IN PROGRAM UNIT: 0
NUMBER OF ERRORS   IN PROGRAM UNIT: 0

935 C
936 C
937       SUBROUTINE QINIT(X)
938 C     INITIALIZES PROCESS QUEUES
939       INTEGER*2 I,J,IND
940       INCLUDE 'COMRAM.FOR'
941       INTEGER*2 WSN(50), MACH(50), BS(50), WSMX, MACHX(1000),WSMACH(50),
942    1     MSTAT(1000), MTOT, PROCES(100,5), STPNUM(5), NUMPR,
943    2     HUBNO(50,5), HUBNOX(50,5), HUBPR(100,5),HUBNOY(50),
944    3     IP(300),IPS(300),WSL(300),IPART(300),MSTRT(5),
945    4     LOTSZ(5),IXLOT,ETYPE(1000),BLNK(1000),MWLOT(1000),
946    5     EHD,ETL,ETLM,ALNK(300),TOTL(5),LHEAD,
947    6     QLOT(300), QPH(100,5), QPT(100,5), QKNT(100,5)
948       REAL FT,RT,SHOR,SETUP, PROTIM, YIELD, ST,AT,TINT,TSTRT,ETIME,
949    1     TIMEX,DT, MAINT, CUM,REST
950       DIMENSION FT(50), RT(50), SETUP(100,5), PROTIM(100,5),
951    1     YIELD(100,5), ST(300), AT(300), ETIME(1000),DT(300),
952    2     TINT(5), MAINT(1000),CUM(100,5),REST(100)
953 C
954       COMMON WSN,MACH,BS,MACHX,MSTAT,WSMACH,WSMX,MTOT,FT,RT
955       COMMON ETYPE,BLNK,MWLOT,EHD,ETL,ETLM,ETIME, MAINT
956       COMMON TIMEX, SHOR, TSTRT, TINT, MSTRT, LOTSZ, TOTL
957       COMMON PROCES,STPNUM,NUMPR,SETUP,PROTIM,YIELD,CUM,REST
958       COMMON HUBNO,HUBNOX,HUBPR,HUBNOY
959       COMMON ALNK,IP,IPS,WSL,IPART,ST,AT,IXLOT,DT,LHEAD
960       COMMON QLOT,QPH,QPT,QKNT
961       DO 500 J=1,NUMPR
962          DO 300 I=1,STPNUM(J)
963             QPH(I,J)=0
964             QPT(I,J)=0
965             QKNT(I,J)=0
966  300     CONTINUE
967          IND=1
```

```
 968              DO 400 I=1,TOTL(J)
 969                  QLOT(IND)=0
 970                  IND=IND+1
 971        400   CONTINUE
 972        500 CONTINUE
 973            RETURN
 974            END
```

NUMBER OF WARNINGS IN PROGRAM UNIT: 0
NUMBER OF ERRORS   IN PROGRAM UNIT: 0

```
 975  C
 976  C
 977          SUBROUTINE CYCLET(CYCLE,OCY)
 978          INTEGER*2 OCY,BNUM(100),LZ,ML,BCASE,BZ,BN,RB
 979          REAL CYCLE
 980  C       STEADY STATE CYCLE TIME ANALYSIS
 981  C       CAN ADD A STANDARD WAIT TIME ARRAY
 982  C       CYCLE   MINIMUM CYCLE TIME
 983  C       OCY     OUTPUT OPTION
 984  C       CYCLE CALCULATES CUM YIELD
 985          INCLUDE 'COMRAM.FOR'
 986          INTEGER*2 WSN(50), MACH(50), BS(50), WSMX, MACHX(1000),WSMACH(50),
 987       1      MSTAT(1000), MTOT, PROCES(100,5), STPNUM(5), NUMPR,
 988       2      HUBNO(50,5), HUBNOX(50,5), HUBPR(100,5),HUBNOY(50),
 989       3      IP(300),IPS(300),WSL(300),IPART(300),MSTRT(5),
 990       4      LOTSZ(5),IXLOT,ETYPE(1000),BLNK(1000),MWLOT(1000),
 991       5      EHD,ETL,ETLM,ALNK(300),TOTL(5),LHEAD,
 992       6      QLOT(300), QPH(100,5), QPT(100,5), QKNT(100,5)
 993         REAL FT,RT,SHOR,SETUP, PROTIM, YIELD, ST,AT,TINT,TSTRT,ETIME,
 994       1      TIMEX,DT, MAINT, CUM,REST
 995         DIMENSION FT(50), RT(50), SETUP(100,5), PROTIM(100,5),
 996       1      YIELD(100,5), ST(300), AT(300), ETIME(1000),DT(300),
 997       2      TINT(5), MAINT(1000),CUM(100,5),REST(100)
 998  C
 999         COMMON WSN,MACH,BS,MACHX,MSTAT,WSMACH,WSMX,MTOT,FT,RT
1000         COMMON ETYPE,BLNK,MWLOT,EHD,ETL,ETLM,ETIME, MAINT
1001         COMMON TIMEX, SHOR, TSTRT, TINT, MSTRT, LOTSZ, TOTL
1002         COMMON PROCES,STPNUM,NUMPR,SETUP,PROTIM,YIELD,CUM,REST
1003         COMMON HUBNO,HUBNOX,HUBPR,HUBNOY
1004         COMMON ALNK,IP,IPS,WSL,IPART,ST,AT,IXLOT,DT,LHEAD
1005         COMMON QLOT,QPH,QPT,QKNT
1006         DO 1000 J=1,NUMPR
1007             CUM(1,J)=1.
1008             DO 800 I=2,STPNUM(J)
1009                 CUM(I,J)=CUM(I-1,J)*YIELD(I,J)
1010       800   CONTINUE
1011             CYCLE=0.
1012             WRITE (*,840)
1013       840   FORMAT (' LOT   LOAD  CASE BATCH LNUMB  LAST, CUM CYCLE')
1014             DO 900  I=1,STPNUM(J)
1015                 INDEX=PROCES(I,J)
1016                 LZ=CUM(I,J)*LOTSZ(J)
1017                 ML=BS(INDEX)
1018                 CALL BATCH(LZ,ML,BCASE,BZ,BN,RB)
1019                 BNUM(I)=BN
1020                 REST(I)=BN*PROTIM(I,J)+SETUP(I,J)
1021                 CYCLE=CYCLE+REST(I)
1022                 WRITE (*,850) LZ,ML,BCASE,BZ,BN,RB,CYCLE
1023       850   FORMAT(6I6,F8.3)
1024       900   CONTINUE
1025             IF (OCY.EQ.0) GOTO 1000
1026  C      PRINT OUT RESULTS
1027             WRITE (*,910) J
1028       910   FORMAT (' PROCESS NUMBER ',I5)
1029             WRITE (*,*)
```

```
1030            WRITE (*,920)
1031    920     FORMAT (' CYCLE TIME ANALYSIS ')
1032            WRITE (*,*)
1033            WRITE (*,930)
1034    930     FORMAT(' STP,  PROCESS, SETUP,   CUM, BATCHES, RES TIME ')
1035            DO 940 I=1,STPNUM(J)
1036               WRITE (*,935) I, PROTIM(I,J),SETUP(I,J),CUM(I,J),BNUM(I),RES
1037    935     FORMAT (I5,3F8.3,I5,F8.3)
1038    940     CONTINUE
1039            WRITE (*,*)
1040            WRITE (*,950) CYCLE
1041    950     FORMAT (' MINIMUM CYCLE TIME ',F10.3)
1042   1000  CONTINUE
1043         RETURN
1044         END
```

NUMBER OF WARNINGS IN PROGRAM UNIT: 0
NUMBER OF ERRORS   IN PROGRAM UNIT: 0

```
1045 C
1046 C
1047         SUBROUTINE BATCH(LZ,ML,BCASE,BZ,BN,RB)
1048 C       SIMPLIFIED BATCH ROUTINE
1049 C       BATCHING-UP IS NOT IMPLEMENTED
1050 C       LZ         LOT SIZE
1051 C       ML         MACHINE LOAD SIZE
1052 C       BCASE      BATCHING CASE
1053 C       BZ         BATCH SIZE
1054 C       BN         NUMBER OF BATCHES
1055 C       RB         BATCH SIZE OF LAST BATCH
1056         INTEGER*2 LZ,ML,BCASE,BZ,BN,RB
1057         IF (LZ.LE.ML) THEN
1058            BCASE = 1
1059            BZ=LZ
1060            BN=1
1061            RB=0
1062         ENDIF
1063         IF (LZ.GT.ML) THEN
1064            BCASE=2
1065            BZ=ML
1066            BN=LZ/ML
1067            RB=LZ-BN*ML
1068            BN=BN+1
1069         ENDIF
1070         RETURN
1071         END
```

NUMBER OF WARNINGS IN PROGRAM UNIT: 0
NUMBER OF ERRORS   IN PROGRAM UNIT: 0

```
1072
1073         SUBROUTINE LOTAB (INDEX)
1074 C       SETS UP LOT TABLES, INITIALIZATION
1075 C       INDEX   NUMBER OF LOTS
1076         INTEGER*2 TOTLX, INDEX
1077         INCLUDE 'COMRAM.FOR'
1078         INTEGER*2 WSN(50), MACH(50), BS(50), WSMX, MACHX(1000),WSMACH(50),
1079        1          MSTAT(1000), MTOT, PROCES(100,5), STPNUM(5), NUMPR,
1080        2          HUBNO(50,5), HUBNOX(50,5), HUBPR(100,5),HUBNOY(50),
1081        3          IP(300),IPS(300),WSL(300),IPART(300),MSTRT(5),
1082        4          LOTSZ(5),IXLOT,ETYPE(1000),BLNK(1000),MWLOT(1000),
```

```
1083        5            EHD,ETL,ETLM,ALNK(300),TOTL(5),LHEAD,
1084        6            QLOT(300), QPH(100,5), QPT(100,5), QKNT(100,5)
1085         REAL FT,RT,SHOR,SETUP, PROTIM, YIELD, ST,AT,TINT,TSTRT,ETIME,
1086        1          TIMEX,DT, MAINT, CUM,REST
1087         DIMENSION FT(50), RT(50), SETUP(100,5), PROTIM(100,5),
1088        1         YIELD(100,5), ST(300), AT(300), ETIME(1000),DT(300),
1089        2         TINT(5), MAINT(1000),CUM(100,5),REST(100)
1090 C
1091         COMMON WSN,MACH,BS,MACHX,MSTAT,WSMACH,WSMX,MTOT,FT,RT
1092         COMMON ETYPE,BLNK,MWLOT,EHD,ETL,ETLM,ETIME, MAINT
1093         COMMON TIMEX, SHOR, TSTRT, TINT, MSTRT, LOTSZ, TOTL
1094         COMMON PROCES,STPNUM,NUMPR,SETUP,PROTIM,YIELD,CUM,REST
1095         COMMON HUBNO,HUBNOX,HUBPR,HUBNOY
1096         COMMON ALNK,IP,IPS,WSL,IPART,ST,AT,IXLOT,DT,LHEAD
1097         COMMON QLOT,QPH,QPT,QKNT
1098         INDEX=1
1099         DO 500 I=1, NUMPR
1100            TOTLX= INT(SHOR/TINT(I))+1
1101            TOTL(I)= (TOTLX)*MSTRT(I)
1102            TIME=TSTRT
1103            DO 400 J=1,TOTLX
1104               DO 300 K=1,MSTRT(I)
1105                  ST(INDEX)=TIME
1106                  IP(INDEX)=I
1107                  IPS(INDEX)=0
1108                  WSL(INDEX)=0
1109                  IPART(INDEX)=LOTSZ(I)
1110                  AT(INDEX)=0.
1111                  INDEX=INDEX+1
1112        300      CONTINUE
1113               TIME=TIME+TINT(I)
1114        400   CONTINUE
1115        500 CONTINUE
1116         INDEX=INDEX-1
1117         IF (NUMPR.EO.1) GOTO 600
1118         CALL LOTSRT(INDEX)
1119         GOTO 700
1120        600 DO 650 I=2, INDEX
1121            ALNK(I-1)=I
1122        650 CONTINUE
1123         ALNK(INDEX)=0
1124        700 CONTINUE
1125         RETURN
1126         END
```

NUMBER OF WARNINGS IN PROGRAM UNIT: 0
NUMBER OF ERRORS   IN PROGRAM UNIT: 0

```
1127 C
1128 C
1129         SUBROUTINE LOTSRT(INDEX)
1130 C       SORTS LOT SET FOR START TIME
1131 C       INDEX  TOTAL NUMBER OF LOTS STARTED
1132         INTEGER*2 INDEX, NLESS2, I,J,K,L,P
1133         LOGICAL SWAP
1134         INCLUDE 'COMRAM.FOR'
1135         INTEGER*2 WSN(50), MACH(50), BS(50), WSMX, MACHX(1000),WSMACH(50),
1136        1         MSTAT(1000), MTOT, PROCES(100,5), STPNUM(5), NUMPR,
1137        2         HUBNO(50,5), HUBNOX(50,5), HUBPR(100,5),HUBNOY(50),
1138        3         IP(300),IPS(300),WSL(300),IPART(300),MSTRT(5),
1139        4         LOTSZ(5),IXLOT,ETYPE(1000),BLNK(1000),MWLOT(1000),
1140        5         EHD,ETL,ETLM,ALNK(300),TOTL(5),LHEAD,
1141        6         QLOT(300), QPH(100,5), QPT(100,5), QKNT(100,5)
1142         REAL FT,RT,SHOR,SETUP, PROTIM, YIELD, ST,AT,TINT,TSTRT,ETIME,
```

```
1143        1           TIMEX,DT, MAINT, CUM,REST
1144          DIMENSION FT(50), RT(50), SETUP(100,5), PROTIM(100,5),
1145        1           YIELD(100,5), ST(300), AT(300), ETIME(1000),DT(300),
1146        2           TINT(5), MAINT(1000),CUM(100,5),REST(100)
1147  C
1148          COMMON WSN,MACH,BS,MACHX,MSTAT,WSMACH,WSMX,MTOT,FT,RT
1149          COMMON ETYPE,BLNK,MWLOT,EHD,ETL,ETLM,ETIME, MAINT
1150          COMMON TIMEX, SHOR, TSTRT, TINT, MSTRT, LOTSZ, TOTL
1151          COMMON PROCES,STPNUM,NUMPR,SETUP,PROTIM,YIELD,CUM,REST
1152          COMMON HUBNO,HUBNOX,HUBPR,HUBNOY
1153          COMMON ALNK,IP,IPS,WSL,IPART,ST,AT,IXLOT,DT,LHEAD
1154          COMMON QLOT,QPH,QPT,QKNT
1155          LHEAD=1
1156          NLESS2=INDEX-2
1157          DO 10 I=2,INDEX
1158             ALNK(I-1) = I
1159             IF (ST(I).LT.ST(LHEAD)) LHEAD=I
1160    10   CONTINUE
1161          ALNK(INDEX)=0
1162  C   BUBBLE SORT LOT START TIMES
1163          DO 60 I=1, NLESS2
1164             SWAP= .FALSE.
1165             P=LHEAD
1166             DO 50 J=I,NLESS2
1167                K=ALNK(P)
1168                L=ALNK(K)
1169                IF (ST(K).LE.ST(L)) GO TO 40
1170                   ALNK(P)=L
1171                   ALNK(K)=ALNK(L)
1172                   ALNK(L) = K
1173                   P=L
1174                   SWAP = .TRUE.
1175                   GOTO 50
1176    40          P = K
1177    50      CONTINUE
1178             IF (.NOT. SWAP) RETURN
1179    60   CONTINUE
1180          RETURN
1181          END

NUMBER OF WARNINGS IN PROGRAM UNIT: 0
NUMBER OF ERRORS   IN PROGRAM UNIT: 0

1182  C
1183         SUBROUTINE IMAGE(X)
1184  C    PRINTS SYSTEM IMAGE AT TIMEX
1185         INTEGER*2 IND,K
1186         INCLUDE 'COMRAM.FOR'
1187         INTEGER*2 WSN(50), MACH(50), BS(50), WSMX, MACHX(1000),WSMACH(50),
1188       1           MSTAT(1000), MTOT, PROCES(100,5), STPNUM(5), NUMPR,
1189       2           HUBNO(50,5), HUBNOX(50,5), HUBPR(100,5),HUBNOY(50),
1190       3           IP(300),IPS(300),WSL(300),IPART(300),MSTRT(5),
1191       4           LOTSZ(5),IXLOT,ETYPE(1000),BLNK(1000),MWLOT(1000),
1192       5           EHD,ETL,ETLM,ALNK(300),TOTL(5),LHEAD,
1193       6           QLOT(300), QPH(100,5), QPT(100,5), QKNT(100,5)
1194         REAL FT,RT,SHOR,SETUP, PROTIM, YIELD, ST,AT,TINT,TSTRT,ETIME,
1195       1           TIMEX,DT, MAINT, CUM,REST
1196         DIMENSION FT(50), RT(50), SETUP(100,5), PROTIM(100,5),
1197       1           YIELD(100,5), ST(300), AT(300), ETIME(1000),DT(300),
1198       2           TINT(5), MAINT(1000),CUM(100,5),REST(100)
1199  C
1200         COMMON WSN,MACH,BS,MACHX,MSTAT,WSMACH,WSMX,MTOT,FT,RT
1201         COMMON ETYPE,BLNK,MWLOT,EHD,ETL,ETLM,ETIME, MAINT
1202         COMMON TIMEX, SHOR, TSTRT, TINT, MSTRT, LOTSZ, TOTL
1203         COMMON PROCES,STPNUM,NUMPR,SETUP,PROTIM,YIELD,CUM,REST
```

```
1204          COMMON HUBNO,HUBNOX,HUBPR,HUBNOY
1205          COMMON ALNK,IP,IPS,WSL,IPART,ST,AT,IXLOT,DT,LHEAD
1206          COMMON QLOT,QPH,QPT,QKNT
1207          WRITE (*,*)
1208          WRITE (*,50) TIMEX
1209    50    FORMAT (' SYSTEM IMAGE AT ',F10.3)
1210          WRITE (*,*)
1211          WRITE (*,51)
1212    51    FORMAT (' LOT ARRAY ')
1213          WRITE (*,52)
1214    52    FORMAT (' NUMBER, START, PROCESS, STEP, STATN, PARTS, ACTION')
1215          IND=1
1216          K=LHEAD
1217          WRITE (*,*) NUMPR,TOTL(1),TOTL(2),TOTL(3),TOTL(4),TOTL(5)
1218          DO 150 J=1,NUMPR
1219             WRITE(*,*) TOTL(J)
1220          DO 60 I=1,TOTL(J)
1221             WRITE (*,59) IND,ST(K),IP(K), IPS(K), WSL(K), IPART(K), AT(K)
1222    59       FORMAT(I5,F8.3,4I5,F8.3)
1223             IND=IND+1
1224             K=ALNK(K)
1225    60    CONTINUE
1226    150   CONTINUE
1227          WRITE (*,*)
1228          WRITE (*,210)
1229    210   FORMAT (' MACHINE LIST')
1230          WRITE (*,*)
1231          WRITE (*,220)
1232    220   FORMAT (' NUMBER, MACHINE, STATUS ')
1233          DO 300 I=1,MTOT
1234             WRITE(*,*) I,MACHX(I),MSTAT(I)
1235    300   CONTINUE
1236  C       EVENTS
1237          IF (EHD.EQ.0) GOTO 400
1238          WRITE (*,*)
1239          WRITE (*,310)
1240    310   FORMAT (' SCHEDULED EVENTS')
1241          WRITE (*,320)
1242    320   FORMAT (' MACH   TYPE  LOT  STATUS    TIME    MAINT')
1243          K=EHD
1244    330   CONTINUE
1245             WRITE (*,340) K, ETYPE(K),MWLOT(K), MSTAT(K),ETIME(K), MAINT(K)
1246    340      FORMAT (4I5,2F8.3)
1247          IF (K.EQ.ETL) GOTO 400
1248          K=BLNK(K)
1249          GOTO 330
1250  C       PROCESS STEP QUEUE STATUS
1251    400   CONTINUE
1252          IF (EHD.GT.0) CALL QEVENT(X)
1253          WRITE (*,*)
1254          DO 450 J=1,NUMPR
1255             DO 440 I=1,STPNUM(J)
1256                IF (QKNT(I,J).EQ.0) GOTO 440
1257                WRITE (*,410) I,J
1258    410         FORMAT(' QUEUE FOR PROCESS STEP',I5,' PROCESS',I5)
1259                WRITE (*,415) QKNT(I,J)
1260    415         FORMAT(' LOTS IN QUEUE ', I5)
1261                K=QPH(I,J)
1262                DO 430 L=1,QKNT(I,J)
1263                   WRITE (*,420) K
1264    420            FORMAT (' LOT   ',I5)
1265                   K=QLOT(K)
1266    430         CONTINUE
1267    440      CONTINUE
1268    450   CONTINUE
1269          CALL QMULTI(X)
```

```
1270 C      STATISTICAL SUMMARIES
1271        RETURN
1272        END
```

NUMBER OF WARNINGS IN PROGRAM UNIT: 0
NUMBER OF ERRORS   IN PROGRAM UNIT: 0

```
1273 C
1274 C
1275        SUBROUTINE QEVENT(X)
1276        INTEGER*2 I,J,K
1277        INCLUDE 'COMRAM.FOR'
1278        INTEGER*2 WSN(50), MACH(50), BS(50), WSMX, MACHX(1000),WSMACH(50),
1279      1           MSTAT(1000), MTOT, PROCES(100,5), STPNUM(5), NUMPR,
1280      2           HUBNO(50,5), HUBNOX(50,5), HUBPR(100,5),HUBNOY(50),
1281      3           IP(300),IPS(300),WSL(300),IPART(300),MSTRT(5),
1282      4           LOTSZ(5),IXLOT,ETYPE(1000),BLNK(1000),MWLOT(1000),
1283      5           EHD,ETL,ETLM,ALNK(300),TOTL(5),LHEAD,
1284      6           QLOT(300), QPH(100,5), QPT(100,5), QKNT(100,5)
1285        REAL FT,RT,SHOR,SETUP, PROTIM, YIELD, ST,AT,TINT,TSTRT,ETIME,
1286      1           TIMEX,DT, MAINT, CUM,REST
1287        DIMENSION FT(50), RT(50), SETUP(100,5), PROTIM(100,5),
1288      1           YIELD(100,5), ST(300), AT(300), ETIME(1000),DT(300),
1289      2           TINT(5), MAINT(1000),CUM(100,5),REST(100)
1290 C
1291        COMMON WSN,MACH,BS,MACHX,MSTAT,WSMACH,WSMX,MTOT,FT,RT
1292        COMMON ETYPE,BLNK,MWLOT,EHD,ETL,ETLM,ETIME, MAINT
1293        COMMON TIMEX, SHOR, TSTRT, TINT, MSTRT, LOTSZ, TOTL
1294        COMMON PROCES,STPNUM,NUMPR,SETUP,PROTIM,YIELD,CUM,REST
1295        COMMON HUBNO,HUBNOX,HUBPR,HUBNOY
1296        COMMON ALNK,IP,IPS,WSL,IPART,ST,AT,IXLOT,DT,LHEAD
1297        COMMON QLOT,QPH,QPT,QKNT
1298        DO 100 I=1,MTOT
1299           WRITE (*,50) I,BLNK(I)
1300     50    FORMAT (2I5)
1301    100 CONTINUE
1302        RETURN
1303        END
```

NUMBER OF WARNINGS IN PROGRAM UNIT: 0
NUMBER OF ERRORS   IN PROGRAM UNIT: 0

```
1304
1305 C
1306 C
1307        SUBROUTINE QMULTI(X)
1308        INCLUDE 'COMRAM.FOR'
1309        INTEGER*2 WSN(50), MACH(50), BS(50), WSMX, MACHX(1000),WSMACH(50),
1310      1           MSTAT(1000), MTOT, PROCES(100,5), STPNUM(5), NUMPR,
1311      2           HUBNO(50,5), HUBNOX(50,5), HUBPR(100,5),HUBNOY(50),
1312      3           IP(300),IPS(300),WSL(300),IPART(300),MSTRT(5),
1313      4           LOTSZ(5),IXLOT,ETYPE(1000),BLNK(1000),MWLOT(1000),
1314      5           EHD,ETL,ETLM,ALNK(300),TOTL(5),LHEAD,
1315      6           QLOT(300), QPH(100,5), QPT(100,5), QKNT(100,5)
1316        REAL FT,RT,SHOR,SETUP, PROTIM, YIELD, ST,AT,TINT,TSTRT,ETIME,
1317      1           TIMEX,DT, MAINT, CUM,REST
1318        DIMENSION FT(50), RT(50), SETUP(100,5), PROTIM(100,5),
1319      1           YIELD(100,5), ST(300), AT(300), ETIME(1000),DT(300),
1320      2           TINT(5), MAINT(1000),CUM(100,5),REST(100)
1321 C
```

```
1322          COMMON WSN,MACH,BS,MACHX,MSTAT,WSMACH,WSMX,MTOT,FT,RT
1323          COMMON ETYPE,BLNK,MWLOT,EHD,ETL,ETLM,ETIME, MAINT
1324          COMMON TIMEX, SHOR, TSTRT, TINT, MSTRT, LOTSZ, TOTL
1325          COMMON PROCES,STPNUM,NUMPR,SETUP,PROTIM,YIELD,CUM,REST
1326          COMMON HUBNO,HUBNOX,HUBPR,HUBNOY
1327          COMMON ALNK,IP,IPS,WSL,IPART,ST,AT,IXLOT,DT,LHEAD
1328          COMMON QLOT,QPH,QPT,QKNT
1329          INTEGER*2 I,J,K,L
1330 C        OUTPUT PROCESS STEP QUEUES
1331          L=1
1332          WRITE (*,30)
1333       30 FORMAT(' LINKED LIST FOR LOT QUEUES')
1334          DO 50 I=1,NUMPR
1335             DO 40 J=1,TOTL(I)
1336                WRITE(*,41) L,QLOT(L)
1337       41       FORMAT(2I5)
1338                L=L+1
1339       40    CONTINUE
1340       50 CONTINUE
1341 C        QUEUE POINTERS AND COUNTS
1342          WRITE (*,55)
1343       55 FORMAT(' PROD PROC KNT  HEAD TAIL')
1344          DO 80 I=1,NUMPR
1345             DO 70 J=1,STPNUM(I)
1346                WRITE(*,60) I,J,QKNT(J,I),QPH(J,I),QPT(J,I)
1347       60       FORMAT(5I5)
1348       70    CONTINUE
1349       80 CONTINUE
1350          RETURN
1351          END
```

NUMBER OF WARNINGS IN PROGRAM UNIT: 0
NUMBER OF ERRORS   IN PROGRAM UNIT: 0

1352

NUMBER OF WARNINGS IN COMPILATION : 0
NUMBER OF ERRORS   IN COMPILATION : 0

What is claimed is:

1. A process for modeling a manufacturing plant, which comprises delineating a set of factory operating rules which define how part lots interact with machines in actual operation of the plant, defining the manufacturing plant by specifying machines in the plant and at least batch size and processing time parameters of each machine, defining products manufactured in the plant, providing fabrication sequences consisting of process steps for the products manufactured in the plant, assigning the process steps to the machines, defining at least time and yield characteristics of each process step, identifying which phenomena in the manufacturing plant are stochastic in nature, and assigning distributions and parameters of the distributions to the stochastic phenomena.

2. The process of claim 1 additionally comprising the steps of using a model resulting from the process to simulate operation of the manufacturing plant, comparing predictions obtained with the simulation with observed manufacturing trends in the plant, and using the comparison to refine choice of fundamental rules and parameters.

3. The process of claim 1 in which the model has a set of fundamental rules including at least one of fabrication sequences, queues, scheduling rules, batching, set up times, yield, and reliability.

4. The process of claim 1 additionally comprising the step of grouping the machines in the plant by workstations, and in which the process steps are assigned to the machines by their workstations.

5. The process of claim 1 in which the manufacturing plant is one of a machine shop, a job shop, an integrated circuit fabrication plant, a semiconductor component assembly plant, a circuit-board fabrication plant, a circuit board assembly plant, a system assembly plant, or a hybrid circuit fabrication plant.

6. The process of claim 5 in which the manufacturing plant is an integrated circuit fabrication plant.

7. The process for modeling a manufacturing plant of claim 1 in which the definition of the manufacturing plant is used to choose a model on the basis of a match between dynamic characteristics of the model and of the manufacturing plant definition, and defining additional parameters of fundamental rules from production data of the manufacturing plant to give a validated model.

8. The process of claim 7 additionally comprising the steps of generating a manufacturing schedule for the plant including part movement and machine loadings, and using the manufacturing schedule to operate the plant.

9. The process of claim 7 additionally comprising the steps of using the model for control of the manufacturing plant, including feed-back and feed-forward control of part movement, machine loadings and part processing.

10. The process of claim 9 additionally comprising the step of tracking production in the plant.

11. The process of claim 7 additionally comprising the step of using the model for determining computer, communication network and data base resource requirements.

12. The process of claim 7 in which the model is used for analysis of fabrication start-up.

13. The process of claim 7 in which the model is used for analysis of clearing accumulated inventory.

14. The process of claim 7 in which the model is used for analysis of inventory, cycle time and throughput trade-offs.

15. The process for modeling a manufacturing plant of claim 7 additionally comprising the step of determining the dynamic finite—loading capacity of the plant.

16. The process for modeling a manufacturing plant of claim 7 additionally comprising the step of automatically balancing allocation of part lots to the machines by choosing between dispatch and priority rules.

17. The process for modeling a manufacturing plant of claim 1 in which the fabrication sequences are dynamic, time-varying fabrication sequences.

18. A process for modeling a distributed manufacturing plant which has fabrication sequences consisting of process steps, in which a model describing actual operation of the plant is obtained, which comprises choosing a dynamic model for the plant from a group of specimen sequenced-dynamic-factory models, determining a set of parameters that describe the plant, describing the parameters in terms of data structures of the chosen model, the chosen factory-specific dynamic model containing descriptions of the dynamic interactions of part lots and machines in the plant, simulating the dynamic behavior of the plant using the chosen factory-specific dynamic model, comparing predictions obtained with the simulation using the model with observed manufacturing trends in the plant, and using the comparison to refine the model.

19. The process of claim 18 in which the dynamic model defines the plant in terms of its machines, products, fabrication sequences, collections of job sets, scheduling rules and machine reliability parameters.

20. The process of claim 18 in which the model has a set of fundamental rules including at least one rule for each of fabrication sequences, queues, scheduling, batching, set up times, yield, and reliability.

21. The process of claim 18 additionally comprising the step of grouping the machines in the plant by workstations, and in which the process steps are assigned to the machines by their workstations.

22. The process of claim 18 in which the manufacturing plant is one of a machine shop, a job shop, an integrated circuit fabrication plant, a semiconductor component assembly plant, a circuit-board fabrication plant, a circuit board assembly plant, a system assembly plant, or a hybrid circuit fabrication plant.

23. The process of claim 22 in which the manufacturing plant is an integrated circuit fabrication plant.

24. The process for modeling a manufacturing plant of claim 18 in which the definition of the manufacturing plant is used to choose a model on the basis of a match between dynamic characteristics of the model and of the manufacturing plant definition, and defining additional parameters of fundamental rules from production data of the manufacturing plant to give a validated model.

25. The process of claim 24 additionally comprising the steps of generating a manufacturing schedule for the plant including part movement and machine loadings, and using the manufacturing schedule to operate the plant.

26. The process of claim 24 additionally comprising the steps of using the model for control of the manufacturing plant, including feed-back and feed-forward control of part movement, machine loadings and part processing.

27. The process of claim 26 additionally comprising the step of tracking production in the plant.

28. The process of claim 24 additionally comprising the step of using the model for determining computer, communication network and data base resource requirements.

29. The process of claim 24 in which the model is used for analysis of fabrication start-up.

30. The process of claim 24 in which the model is used for analysis of clearing accumulated inventory.

31. The process of claim 24 in which the model is used for analysis of inventory, cycle time and throughput trade-offs.

32. The process for modeling a distributed manufacturing plant of claim 18 additionally comprising the step of determining the dynamic finite—loading capacity of the plant.

33. The process for modeling a distributed manufacturing plant of claim 18 additionally comprising the step of automatically balancing allocation of part lots to the machines by choosing between dispatch and priority rules.

34. In a process for dynamic, real world modeling of a manufacturing plant including the steps of specifying machines in the manufacturing plant and defining lots of parts manufactured in the plant, the improvement which comprises defining dynamic fabrication sequences as an ordered sequence of process steps and an ordered sequence of product flow, both of which change in time as a result of manufacturing plant conditions.

35. The process for modeling a manufacturing plant in accordance with claim 34, further comprising the step of delineating a set of factory operating rules which define low part lots interact with machines in actual operation of the plant.

36. The process for modeling a manufacturing plant of claim 34, further comprising the steps of defining a yield model for determining a proportion of a predetermined number of parts successfully processed in the plant in accordance with the model of the manufacturing plant obtained with the process of claim 31.

37. The process for modeling a manufacturing plant of claim 36, further comprising the steps of defining a machine availability model for determining a proportion and distribution of time during operation of the plant that machines in the plant are unavailable for use.

38. The process for modeling a manufacturing plant of claim 37, further comprising the steps of establishing rules for defining batches for manufacturing the products in the plant, and using the rules to determine batches in operation of the plant.

39. The process for modeling a manufacturing plant of claim 38, further comprising the steps of providing rules for establishing set-up time for the machines in the manufacturing plant, and using the rules to determine set-up time in operation of the plant.

40. The process for modeling a manufacturing plant of claim 39, further comprising the steps of providing a queue structure and using the queue structure to classify parts during their manufacture in the plant.

41. The process for modeling a manufacturing plant of claim 40, further comprising the steps of establishing scheduling rules for operating the manufacturing plant and using the scheduling rules to determine an order in which to process the parts during their manufacture in the plant.

42. The process for modeling a manufacturing plant of claim 41 in which the scheduling rules are established by providing a data structure for each entity and its attributes in the model of the manufacturing plant obtained with the process, defining events which follow fundamental rules of the model, tracking changes in the model which take place as a result of events that occur, scheduling new events as the result of the changes, and sorting and ordering the resulting scheduled events.

43. The process of claim 42 in which the manufacturing plant is one of a machine shop, a job shop, an integrated circuit fabrication plant, a semiconductor component assembly plant, a circuit-board fabrication plant, a circuit board assembly plant, a system assembly plant, or a hybrid circuit fabrication plant.

44. The process of claim 43 in which the manufacturing plant is an integrated circuit fabrication plant.

45. The process for modeling a manufacturing plant of claim 34, further comprising the steps of establishing scheduled rules for operating the manufacturing plant and using the scheduling rules to determine an order in which to process the parts during their manufacture in the plant.

46. The process for modeling a manufacturing plant of claim 45 in which the scheduling rules are established by providing a data structure for each entity and its attributes in the model of the manufacturing plant obtained with the process, defining events which follow fundamental rules of the model, tracking changes in the model which take place as a result of events that occur, scheduling new events as the result of the changes, and sorting and ordering the resulting scheduled events.

47. The process for modeling a manufacturing plant of claim 34 in which the definition of the manufacturing plant is used to choose a model on the basis of a match between dynamic characteristics of the model and of the manufacturing plant definition, and defining additional parameters of fundamental rules from production data of the manufacturing plant to give a validated model.

48. The process of claim 47 additionally comprising the steps of generating a manufacturing schedule for the plant including part movement and machine loadings, and using the manufacturing schedule to operate the plant.

49. The process of claim 47 additionally comprising the steps of using the model for control of the manufacturing plant, including feed-back and feed-forward control of part movement, machine loadings and part processing.

50. The process of claim 49 additionally comprising the step of tracking production in the plant.

51. The process of claim 47 additionally comprising the step of using the model for determining computer, communication network and data base resource requirements.

52. The process of claim 47 in which the model is used for analysis of fabrication start-up.

53. The process of claim 47 in which the model is used for analysis of clearing accumulated inventory.

54. The process of claim 47 in which the model is used for analysis of inventory, cycle time and throughput trade-offs.

55. The process of claim 47 in which the manufacturing plant is one of a machine shop, a job shop, an integrated circuit fabrication plant, a semiconductor component assembly plant, a circuit-board fabrication plant, a circuit board assembly plant, a system assembly plant, or a hybrid circuit fabrication plant.

56. The process of claim 55 in which the manufacturing plant is an integrated circuit fabrication plant.

57. The process for dynamic, real world modeling of a manufacturing plant of claim 34 additionally comprising the step of determining the dynamic finite—loading capacity of the plant.

58. The process for dynamic, real world modeling of a manufacturing plant of claim 34 additionally comprising the step of automatically balancing allocation of part lots to the machines by choosing between dispatch and priority rules.

* * * * *